United States Patent
Miller

(10) Patent No.: US 7,065,274 B2
(45) Date of Patent: Jun. 20, 2006

(54) OPTICAL COUPLING DEVICE

(75) Inventor: Robert O. Miller, Rochester, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 9 days.

(21) Appl. No.: 10/855,482

(22) Filed: May 27, 2004

(65) Prior Publication Data

US 2005/0265659 A1  Dec. 1, 2005

(51) Int. Cl.
*G02B 6/26* (2006.01)
(52) U.S. Cl. .............. 385/43; 385/39; 385/42; 385/50
(58) Field of Classification Search ............. 385/39, 385/42, 43, 50
See application file for complete search history.

(56) References Cited

U.S. PATENT DOCUMENTS 6,829,417 B1 * 12/2004 Greiner et al. ............. 385/37
2004/0156590 A1 * 8/2004 Gunn et al. ............... 385/37

* cited by examiner

*Primary Examiner*—Frank G. Font
*Assistant Examiner*—Eric Wong
(74) *Attorney, Agent, or Firm*—Kevin L. Bray; Marvin S. Siskind

(57) ABSTRACT

An optical coupling device for the efficient transfer of an optical signal between optical components. The device can receive an optical signal from a transmitting component connected to its input end and efficiently transmit that signal to a receiving component connected to its output end. The instant device includes a combination of two or more dielectric materials and provides impedance matching at the input and output ends as well as impedance conservation during propagation of the optical signal through the device. Impedance matching at the input and output ends is controlled through variations in the relative proportions of the constituent dielectric materials of the device in the cross-sections of input and output ends to achieve an effective permittivity that closely matches that of the interconnected component. Impedance conservation within the instant device is achieved through simultaneous variations in the cross-sectional shape of the device and cross-sectional fill factors of the constituent dielectric materials. The impedance conditions, in combination with high spatial overlap at the input and output ends, minimize losses in the power of signal transmitted between the interconnected optical components.

25 Claims, 20 Drawing Sheets x-POLARIZING

OPTICAL COUPLING DEVICE

FIELD OF INVENTION

This invention pertains to optical coupling devices that interconnect optical elements. The optical coupling devices efficiently transfer light from one optical element to another optical element along an interconnection path. More specifically, this invention pertains to optical coupling devices that integrate two or more optical media in such a way that the cross-sectional area and/or refractive index of the coupling device vary smoothly along an interconnection pathway between optical elements.

BACKGROUND OF THE INVENTION

The development of communication systems over time has been central to the progress of human civilization. The evolution of communications has largely been a story of technological evolutions that have served to increase the bandwidth, speed and distance of communications. The era of electronic communications began with Morse's development of the telegraph, a technology that provided instantaneous communication, but at a rate of only a few bits per second. Bell's telephone, developed in 1870's, was the first major extension of the telegraph and provided a 4 kHz bandwidth. Trends in communications continued to evolve to higher frequency carrier waves, which have proportionally higher bandwidths for carrying information. Early radio operated in the 1 MHz range and provided a bandwidth of 15 kHz. Analog television requires a bandwidth of about 6 MHz and was achievable through carrier frequencies distributed from 54–806 MHz. Advances in communications continued through the advent of semiconductor electronics and the development of the transistor in the 1950's. Silicon-based electronic devices offer bandwidths in the GHz range.

It has long been realized that communications based on an optical source would offer far greater bandwidth than electronic systems. Optical frequencies are in the range of a few hundred THz, frequencies that greatly exceed the switching and modulation speeds of electronic systems. Major steps toward the realization of optical communications systems include the development of waveguides and optical fibers, including the identification and processing of materials having suitably low absorption and scattering losses, and the advent of the laser. Achievement of THz range communication frequencies has, however, proven to be more challenging than expected as the initial and most of today's optical communication systems are optoelectronic in nature and rely on electronic components (e.g. switches, modulators, controllers, amplifiers, connectors, filters) to control light. These components introduce an electronic bottleneck that limits the ability of the communications industry to realize the full potential of optical carrier frequencies. Although the capabilities of electronic components have greatly improved over the past several decades, it is widely believed that electronic devices are quickly approaching their ultimate speeds. Further improvements in bandwidth require new strategies, unconstrained by the limitations of electronics, for controlling light. Ideally, an all-optical system is desired.

In order to achieve an all-optical communications network, it is necessary to develop optical analogs or successors of the existing electronic devices used in today's optoelectronic systems and to package those components in an efficient, compact system. Much of today's effort is directed at developing optical connectors, switches, modulators etc. at the device level and in integrating these devices in a manner analogous to the successful designs used in integrated electronic circuits. From a processing point of view, planar structures are desired and as a result, the planar waveguide is the primary conduit for directing light in an integrated optical system. The planar waveguide becomes the optical analog of the wire interconnect of an integrated electronic circuit. Transmission of light over large distances, however, is accomplished by directing light through single-mode optical fibers since it is now possible to economically fabricate low loss optical fibers having kilometer scale lengths.

In most designs of an all-optical communication network, light is transferred between integrated optical components using optical fibers. The integrated optical components are active elements that generate, process and detect optical signals and the optical fibers are passive elements that serve to route light between the integrated optical components in a network. The successful implementation of an all-optical communication network thus requires an efficient coupling of optical fibers to integrated optical components, especially planar components. Since the input optical signals received by an integrated optical component are initially introduced into a waveguide, a central issue in the coupling of fibers to planar integrated optical components is the efficient transfer of light from a fiber into a planar waveguide.

The fiber-waveguide junction is a key source of loss in an all-optical system. The origin of the losses arises from differences in the propagation characteristics of light in different optical components due to differences in the optical medium and confinement. Optical fibers, for example, transport optical modes having a large diameter power profile due to the weak confinement provided by the small refractive index difference between the core and cladding. Integrated waveguides, in contrast, typically use a guiding material (e.g. silicon) having a higher index of refraction than the material used in a fiber (e.g. silica) and/or stronger confinement, with the result that the guided mode diameter is much smaller in an integrated waveguide than in a fiber. Typically, the mode diameters of a single-mode silica fiber and a silicon waveguide are 10 µm and 0.5 µm, respectively. Efficient coupling of a fiber to a waveguide thus requires a mechanism for transforming a mode having a characteristic fiber diameter into a mode having a characteristic waveguide diameter and vice versa. The potential for losses in the transformation is high, especially in the fiber to waveguide direction since a large diameter beam needs to be converted to a small diameter beam without substantial loss of power. Simple end-coupling (back-to-back placement) of a fiber to an integrated waveguide leads to substantial losses due to the large mismatch in cross-sectional area between the fiber and the waveguide. Much of the signal exiting the fiber is unable to enter the much smaller waveguide due to a mismatch in the physical dimensions or cross-sectional spatial overlap at the point of transfer between the fiber and waveguide. Some of the light exiting a large diameter fiber necessarily bypasses a waveguide having a smaller cross-section in at least one direction and this light necessarily represents a loss in optical signal.

One solution in the prior art for adjusting mode diameter in the transfer of an optical signal from a fiber to a waveguide is tapering. The purpose of tapering is to adjust the physical dimensions of the fiber or waveguide so that a better match in mode diameter is achieved. In fiber-tapering, the goal is to decrease the mode diameter by narrowing the output end through a reduction in physical dimensions to provide a better match for the acceptance aperture of an integrated waveguide. In this way, better cross-sectional overlap of the beam exiting the fiber and beam optimally guided by the waveguide is achieved. Lensing fibers have similarly been used for this purpose. Although fiber-tapering and lensing provide improvements, the achievable mode diameters are limited by the beam waist limit in free space and this limit is still larger than the aperture of a typical silicon waveguide. Alignment requirements are also stringent.

An alternative solution in the prior art is waveguide tapering. In waveguide tapering, the goal is to increase the mode diameter at the acceptance or receiving end of the waveguide so that a better match with the fiber is achieved. Waveguide tapering can be accomplished through up-tapering or down-tapering. In an up-tapering configuration, the ends of a planar waveguide are ramped or flared outward and upward to match the physical dimensions of the fiber core to provide increased cross-sectional overlap. The flared ends receive the large diameter beam from the fiber and focus it down gradually to the desired sub-micron dimensions as the flared ends converge and merge with the planar waveguide. The flared ends similarly work in reverse and convert a small diameter waveguide mode into a large diameter mode that can be transmitted to a fiber.

The practical difficulty with the up-tapering configuration is processing. Up-tapering requires tall out-of-plane structures that are complicated to fabricate in a planar processing technology. Another problem is that long tapers are needed for mode conservation and to minimize losses. Long tapers provide a gradual transformation of mode diameter and minimize the tendency of the transferred mode from distributing its power among the many allowed modes of the integrated waveguide. Distribution of the fiber mode into two or more of the allowed or radiation modes of the waveguide leads to scattering losses. These losses can be minimized only through the formation of long, extended tapers (on the mm scale). Such tapers consume large amounts of the available area of an integrated optical device.

Waveguide tapering can also be achieved in a down-tapering configuration in which the receiving end of the waveguide is decreased to a tip having a size in the nanometer regime that is sufficiently small to permit a delocalization of the mode field. The delocalization leads to an expansion of the waveguide mode beyond waveguide core and into the cladding to provide better spatial overlap with the fiber core. The drawbacks of down-tapering are the processing complexities inherent in forming the required nanoscale tapered tip and alignment difficulties.

Any mismatch in the refractive index between the fiber core and integrated waveguide leads to reflection losses that further reduce the efficiency of power transfer.

The deficiencies in the prior art methods for coupling optical fibers to integrated waveguides demonstrates a need for new coupling devices that provide a more efficient coupling of modes between optical fibers and waveguides. Ideally, the coupling devices should provide for the efficient transfer of power back and forth between a fiber and a waveguide while preserving the mode symmetry and avoiding scattering and reflection losses. In many applications, it is further desired to produce a mode of a desired polarization in the waveguide (e.g. TE or TM) from the randomly polarized beam emerging from a fiber.

SUMMARY OF THE INVENTION

This invention provides an optical coupling device that efficiently transfers an optical mode from a transmitting optical element to a receiving optical element. The device can receive an optical signal from a transmitting component connected to its input end and efficiently transmit that signal to a receiving component connected to its output end.

The instant device includes a combination of two or more dielectric materials and provides impedance matching at the input and output ends as well as impedance conservation during propagation of the optical signal through the device. Impedance matching at the input and output ends is controlled through variations in the relative proportions of the constituent dielectric materials of the device in the cross-sections of input and output ends to achieve an effective permittivity that closely matches that of the interconnected component. Impedance conservation within the instant device is achieved through simultaneous variations in the cross-sectional shape of the device and cross-sectional fill factors of the constituent dielectric materials. The impedance conditions, in combination with high spatial overlap at the input and output ends, minimize losses in the power of signal transmitted between the interconnected optical components.

In one embodiment of the instant invention, the coupling device couples an optical signal from a round fiber as transmitting element to a square or rectangular slab waveguide as receiving element. In this embodiment, the optical signal is transformed from a beam having a circular cross-section into a beam having a rectangular cross-section. Other embodiments of the instant coupling device permit the coupling of optical signals between two fibers (e.g. transfer of an optical signal from a large diameter fiber to a small diameter fiber or vice versa) or two slab waveguides (e.g. transfer of an optical signal from a waveguide having a square cross-section to a waveguide having a rectangular cross-section or vice versa, between a large side length square waveguide to a small side length square waveguide or vice versa, from a waveguide having one rectangular cross-section to a waveguide having a different rectangular cross-section etc.).

In still other embodiments, optical signals with beams having arbitrary cross-sectional shapes are accepted by and transmitted through the instant coupling devices. Optical beams having an elliptical cross-section, for example, may be coupled between a transmitting element and a receiving element and can be transformed into circular or rectangular beams or vice versa. In further embodiments, beams of an arbitrary cross-sectional shape can be transformed into a different arbitrary shape. In additional embodiments, beams of a given cross-sectional shape can maintain that shape while being enlarged or reduced in dimension during propagation through the instant coupling device. The input and output cross-sections of the instant coupling devices may be round, square, rectangular, or any other shape including round or linear sides including symmetric and asymmetric shapes.

In still other embodiments, the state of polarization can be transformed from among and between unpolarized, randomly polarized, vertically polarized, horizontally polarized, and intermediate states of polarization. Modification in polarization can occur in combination with, or independently of, a change in the shape or size of the cross-section of an optical beam. Variations in polarization are achieved by varying the cross-sectional shape of a first dielectric material interspersed within a second dielectric material along the direction of propagation of the optical signal.

In addition to dual material combinations, the instant coupling devices may contain three or more dielectric materials and that the devices may include materials other than air, glass and silicon may be included therein. Dielectrics including, but not limited to, air, silicon, germanium, compound semiconductors such as III–V's (e.g. including alloys and compounds such as GaAs, InP, InGaAs, AlInGaAs etc.) and II–VI's (e.g. CdS, CdSe, ZnS, ZnSe, etc.) oxide; chalcogenide crystals and glasses generally, including metal oxides, silicates, zeolites, perovskites, garnets; polymers, gels, diamond, and combinations thereof may be employed as dielectric materials in the instant devices. The dielectric materials included in the instant coupling device may be the same as or different from the materials present in the interconnected transmitting and receiving devices. The principles of operation rely on considerations pertaining to impedance matching at the input and output ends and conservation of impedance through the coupling device.

DETAILED DESCRIPTION OF THE ILLUSTRATED EMBODIMENTS

Figure 1:
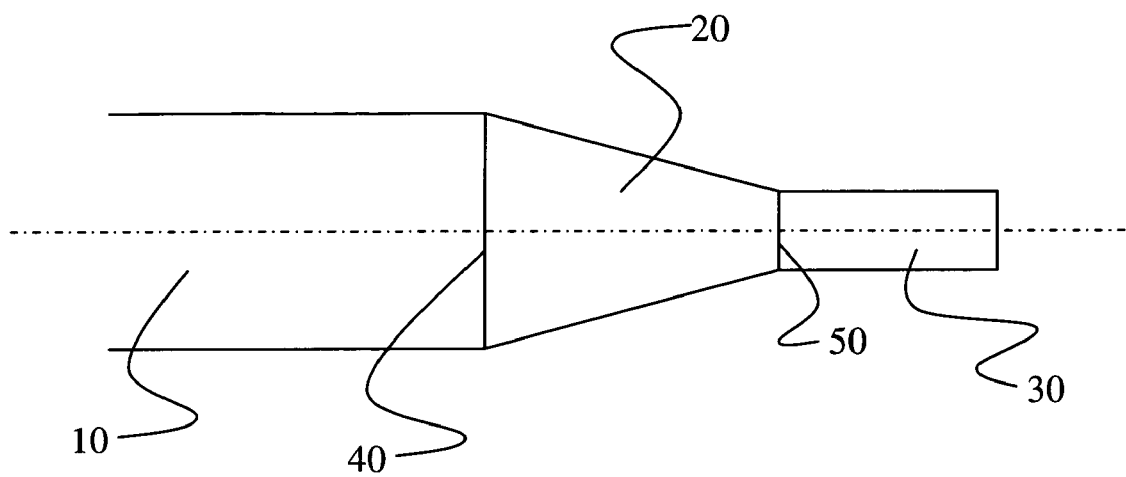
FIG. 1. Schematic depiction of the connection of a coupling device to a transmitting element to a receiving element.

This invention provides an optical coupling device that efficiently transfers an optical mode from a transmitting optical element to a receiving optical element. Efficient transfer of an optical signal from one optical element to another requires a coupling device that maximizes the power or strength of the optical signal transferred. In many applications it is also desirable to preserve characteristics such as mode symmetry and inhibit redistribution of power into multiple guided or radiation modes upon transfer of the optical signal.

Maximization of the power transferred from one element to another requires: adequate spatial overlap of the transmitting element and coupling device at the input end of the coupling device, minimization of reflection losses at the junction between the transmitting element and the coupling element, minimization of the scattering or reflecting of the optical signal as it passes through the coupling device, adequate spatial overlap of the coupling device and receiving element at the output end of the coupling device, and minimization of reflection losses at the junction between the coupling element and the receiving element.

The instant coupling device is an interconnection element designed to efficiently transfer an optical signal from a transmitting element to a receiving element. The instant device has an input end that accepts an optical signal from the transmitting element and an output end that provides the optical signal to the receiving element. In one embodiment herein, the input end of the instant coupling device is physically connected to the transmitting element and the output end of the instant coupling device is physically connected to the receiving element. The optical signal passes through the instant coupling device along an interconnection pathway. The instant device minimizes coupling losses by providing one or more of the following: adequate spatial overlap at the input end with the transmitting device to provide high acceptance of the optical signal exiting the transmitting element, close index or impedance matching at the input end with the transmitting element to minimize reflection losses upon acceptance of the optical signal, conservation of impedance or a close approximation thereto of the optical signal as its characteristics (e.g. diameter, confinement, mode shape, mode profile) vary along the interconnection pathway as it passes through the instant coupling device to minimize reflection and/or scattering losses during the internal propagation of the optical signal through the instant device, close index or impedance matching at the output end with the receiving element so that reflection losses are minimized as the optical signal exits the instant coupling device, and adequate spatial overlap at the output end with the receiving device so that high acceptance of the signal exiting the instant device by the receiving element is achieved.

The instant device is designed so that the guided mode characteristics at the input end are similar to those of the transmitting element and/or the guided mode characteristics at the output end are similar to those of the receiving element. The instant coupling devices thus provide for a conversion of the optical signal from mode conditions characteristic of the transmitting element to mode conditions characteristic of the receiving element, while minimizing losses by incorporating one or more of the following features: index or impedance matching at the junction of the input end with the transmitting element and/or index or impedance matching at the junction of the output end with the receiving element and/or impedance matching along the interconnection pathway within the instant coupling device as the mode characteristics (e.g. mode diameter, mode field, confinement) of the optical signal are modified during propagation through the device.

The strategy employed in the instant coupling devices recognizes that losses in conventional coupling devices occur predominantly at the junctions or interfaces between a coupling device and other devices (e.g. the transmitting and receiving elements) as well as during propagation of an optical signal through the coupling device. If an optical signal passes from one medium to another, or is transmitted through a medium that gradually and continuously changes its shape or optical properties, it reflects or scatters unless the characteristic impedance remains constant. Since reflection and scattering represent losses of optical signals, they need to be minimized in order to maximize the transferred power of an optical signal. The instant devices employ an impedance matching and conservation strategy to minimize reflection and scattering losses. The instant devices match or approximately match impedance at junctions or interfaces between devices and conserve or approximately conserve impedance along an interconnection pathway within the device.

From the perspective of constructing optical circuits with minimal loss, a critical objective in the design of a coupling device is achieving a device that conserves input impedance. In the theory discussed below, we introduce a quantity that we refer to as the characteristic impedance of the coupling device and focus the description on design considerations intended to conserve the characteristic impedance along the coupling device. The characteristic impedance of the coupling device corresponds to its input impedance when it is in an unloaded configuration. The characteristic impedance is a more convenient frame of reference for describing the coupling device than the input impedance because it permits us to concentrate on features of the device itself, rather than effects external to the device (e.g. elements connected to the output end of the device and later elements in the circuit) that may influence input impedance. Since the conservation of the characteristic impedance of the coupling device insures conservation of its input impedance when placed in a circuit, we choose to discuss the instant invention in terms of the more convenient characteristic impedance quantity.

Our theoretical framework for considering impedance is based on transmission line theory. In transmission line theory, a passive optical element (e.g. waveguides (including fibers, planar or integrated waveguides) and coupling devices) is viewed as a transmission line having a wave impedance defined in terms of optical field (E, H) or material ($\mu$, $\sigma$, $\epsilon$) parameters. The central parameters in transmission line theory are the inductance L and capacitance C of a transmission line.

An optical waveguide can be modeled in transmission line theory through an analogy in which an effective inductance L and an effective capacitance C of the waveguide are determined from the field and material parameters of the waveguide structure. In this analogy, the characteristic impedance $Z_c$ of a dielectric optical waveguide or coupling device can be written:

$$Z_c = \sqrt{\frac{L}{C}} = \frac{\sqrt{\mu\varepsilon}}{C} = (\sqrt{\mu_0\varepsilon_0})\frac{\sqrt{\varepsilon_e}}{C}$$

where $\epsilon$ and $\mu$ are the permittivity and permeability, respectively, $\mu_0$ is the vacuum permeability (which, for a typical dielectric material, is a close approximation of $\mu$), $\epsilon_0$ is the vacuum permittivity and $\epsilon_e$ is an effective permittivity of the waveguide structure. Since the effective capacitance C of the waveguide or coupling device structure can be written as a product of $\epsilon_e$ and a dimensionless function $C_g$ of the cross-sectional geometry and mode shape of the waveguide or coupling device, we can write:

$$Z_c = (\sqrt{\mu_0\varepsilon_0})\frac{1}{C_g\sqrt{\varepsilon_e}}$$

Since $\mu_0$ and $\epsilon_0$ are constants, any change in the effective impedance due to a change in the shape or physical dimensions of the waveguide or coupling device structure or mode shape or confinement (i.e. any change in $C_g$) can be offset by a compensating change in the effective permittivity $\epsilon_e$ to maintain a constant impedance.

Since the permittivity of a material is directly related to the dielectric constant or refractive index of a material, the foregoing analysis may be similarly presented in terms of these quantities. The dielectric constant is simply the ratio of the permittivity (or effective permittivity) of a material to the vacuum permittivity and the refractive index is the square root of the dielectric constant. Changes in effective impedance of a coupling device can thus be offset by appropriate compensating changes in effective permittivity, dielectric constant or refractive index.

A coupling device may convert an input mode (a mode received at the input end of the coupling device) having a particular mode profile into an output mode (a mode delivered at the output end of the coupling device) having a different mode profile when the physical dimensions (e.g. cross-sectional area or shape) of the coupling device vary along the direction of propagation of a mode through the coupling device. A change in the physical dimensions of the coupling device leads to a change in the impedance of the coupling device through the factor $C_g$. In the instant coupling devices, impedance effects due to changes in the shape of the coupling device along the mode propagation pathway are offset or substantially offset through a compensating change in the effective permittivity of the coupling device along the mode propagation pathway so that a coupling device having a constant or substantially constant impedance along the mode propagation pathway is provided. As a result, reflection and/or scattering losses associated with the propagation of a mode from the input end to the output end of the coupling device are minimized and the power transmitted through the coupling device is maximized.

The instant coupling devices include a combination of two or more interspersed dielectric media and may be used as interconnection devices to efficiently transfer an optical signal from a transmitting element to a receiving element. The input end of the instant coupling device has a cross-sectional shape and impedance that closely matches those of the transmitting element and the output end of the instant coupling device has a cross-sectional shape and impedance that closely match those of the receiving element. In a typical application, the transmitting and receiving elements interconnected to the instant coupling device have different cross-sectional shapes and/or different cross-sectional areas so that the mode profile (including the cross-sectional shape of the mode and the distribution of optical intensity within the mode cross-section) supported by the transmitting and receiving elements differ. In such applications, the instant coupling devices convert from the mode profile of the transmitting element to the mode profile of the receiving element through a continuous variation in the cross-sectional shape or area of the coupling device along the pathway traversed by the optical signal. As discussed hereinabove, a change in cross-sectional shape or area or other physical dimension of a coupling device by itself leads to a change in the impedance of the coupling device and hence may represent a source of loss of an optical signal propagating through the coupling device.

The instant coupling device compensates for any change in impedance resulting from a change in the geometry, shape, cross-section or other physical dimension that occurs along the propagation pathway of an optical signal through the device by providing an offsetting change in the effective permittivity. The effective permittivity of the instant devices may be varied between the input end and the output end by varying the relative proportion of each of the two or more interspersed dielectric materials contained in the device. In a preferred embodiment, the effective permittivity is varied continuously between the input end and output end by varying the fill factor of each of two or more dielectric materials to the cross-section of the instant device along the propagation pathway. (Fill factor refers to the relative or fractional contribution of a material to the cross-sectional area of the coupling device, where the cross-sectional area is generally a cross-section orthogonal to the direction of propagation of the optical signal or the central axis of the coupling device.) Simultaneous and compensating changes in the cross-sectional dimensions and effective permittivity along the propagation pathway of the instant device provide for constant or substantially constant impedance along the propagation path.

Further explanation of the principles of operation and design of the instant coupling devices is provided in the following illustrative examples.

EXAMPLE 1

In this example, we consider an embodiment of the instant device that includes two interspersed dielectric materials where the dielectric materials have different permittivities. The device has an input end having an input cross-section and an output end having an output cross-section where the cross-sectional area of the device varies continuously from the input cross-section to the output cross-section along the length of the device. The input and output cross-sections have a cross-sectional area that includes a certain fill factor of one of the dielectric materials and a certain fill factor of the other of the dielectric materials where the fill factors of the two dielectric materials differ in the input and output cross-sections. In a preferred embodiment, the fill factors of the two dielectric materials vary continuously over different cross-sections along a propagation pathway through the device.

The coupling device in this example interconnects an optical fiber and a planar waveguide, as shown schematically in FIG. 1. The fiber 10 is a circular fiber having a glass core and the planar waveguide 30 is a silicon slab waveguide. In a representative embodiment, the glass core of the fiber has a refractive index of about 1.45 and a diameter of about 9 μm and the silicon slab waveguide has a width of about 1.5 μm and a refractive index of about 3.4. The silicon slab waveguide also typically has a square or rectangular cross-section. In this example, light is propagating from the fiber through the coupling device 20 into the waveguide so that the input end 40 of the coupling device is connected to the fiber and the output end 50 of the coupling device is connected to the waveguide. The coupling device 20 has a tapered shape in which the cross-sectional area encountered by a propagating optical signal decreases between the input end and output end. In this example, the central axis of the fiber is aligned with a central axis of the waveguide.

Figure 2:
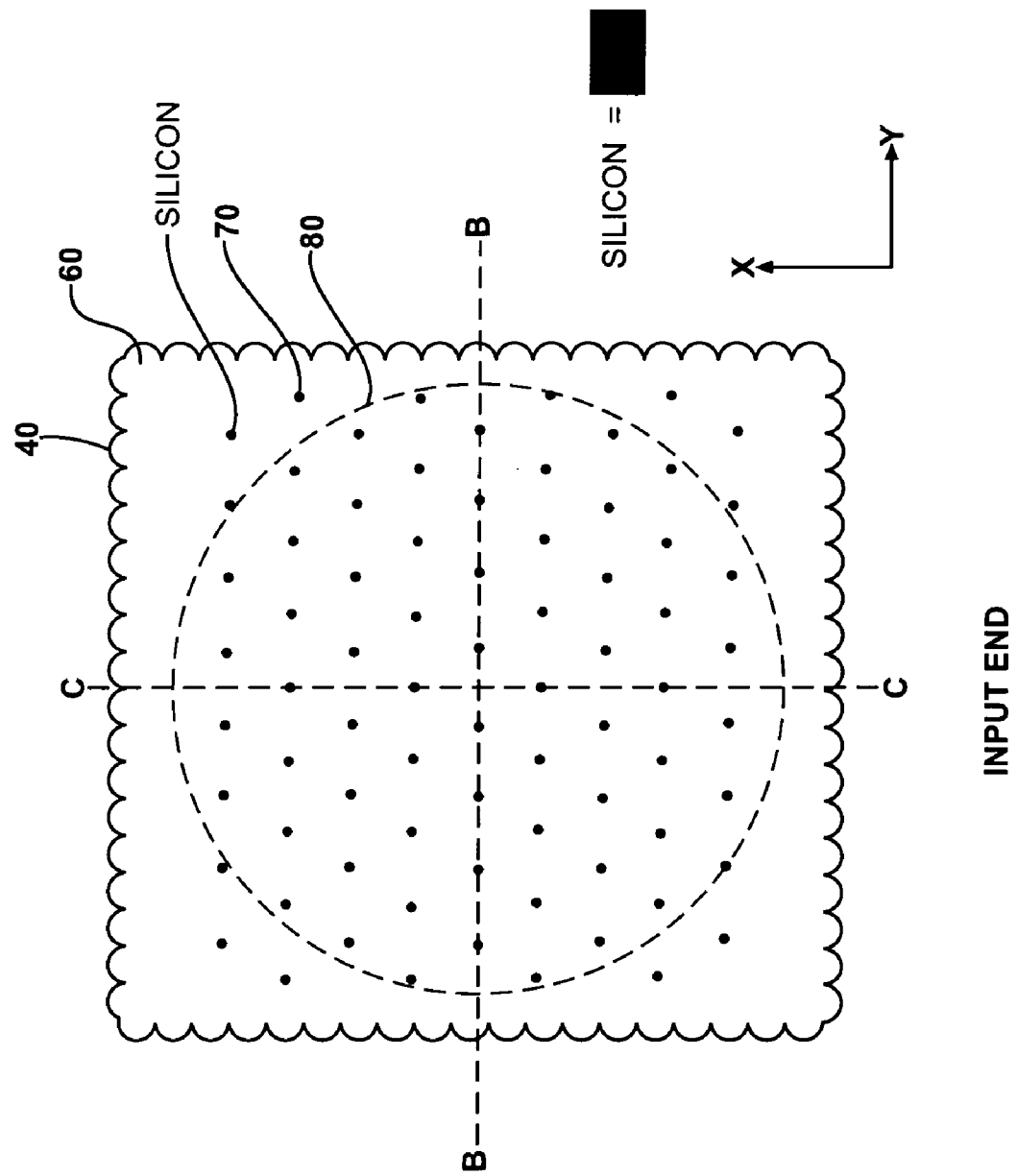
FIG. 2. Input cross-section of a coupling device comprising silicon and glass.

FIG. 2 shows an end view of the input end 40. The end view corresponds to the input cross-section of the coupling device. The input cross-section includes a glass region 60 having interspersed silicon regions 70 contained therein. In the embodiment of FIG. 2, the silicon regions 70 are discrete regions having a square shape in the input cross-section. The space occupied by a discrete region of an interspersed dielectric material in a cross-section of the instant coupling device may be referred to herein as the fill area or fill unit of the discrete region. A fill area or fill unit has a shape and a size associated therewith. In this example, the discrete silicon regions have a fill area that has a fill shape that is square and a relative fill size as shown in FIG. 2. Also shown in FIG. 2 is an outline 80 of the fiber core. The substantial spatial overlap of the input cross-section of the coupling device with the fiber core permits high acceptance of the optical signal by the coupling device.

Reference directions x and y are also shown in FIG. 2. The x-direction and y-direction correspond to the directions indicated by the dashed reference lines C—C and B—B, respectively, shown in FIG. 2. The z-direction corresponds to the perpendicular direction into the plane of the figure. The x-, y-, and z-directions are included in the discussion and figures of this example to obtain a three-dimensional perspective of the coupling device. In FIG. 2, the input end is located in an xy-plane and the coupling device extends behind the plane of the page in the z-direction. The z-direction is the direction of propagation of the optical signal in this example.

Close impedance matching of the fiber and the coupling device at the input end is achieved by forming the glass region 60 from the same glass present in the fiber core and by making the fill factor of the silicon regions 70 in the input cross-section low. As described hereinabove, the fill factor is the relative area of the silicon regions 70 in the input cross-section 40. In this example, the fill factor corresponds to the ratio of the combined fill area of the discrete silicon regions 70 to the overall cross-sectional area of the input end of the coupling device. A small presence of silicon regions 70 in conjunction with use of the glass used in the fiber provides a permittivity at the input end of the coupling device that is very close to that of the fiber core. The combination of similar permittivity and high spatial overlap insures close impedance matching and high acceptance at the input end. Losses at the junction between the fiber and coupling device are thereby minimized.

Figure 3:
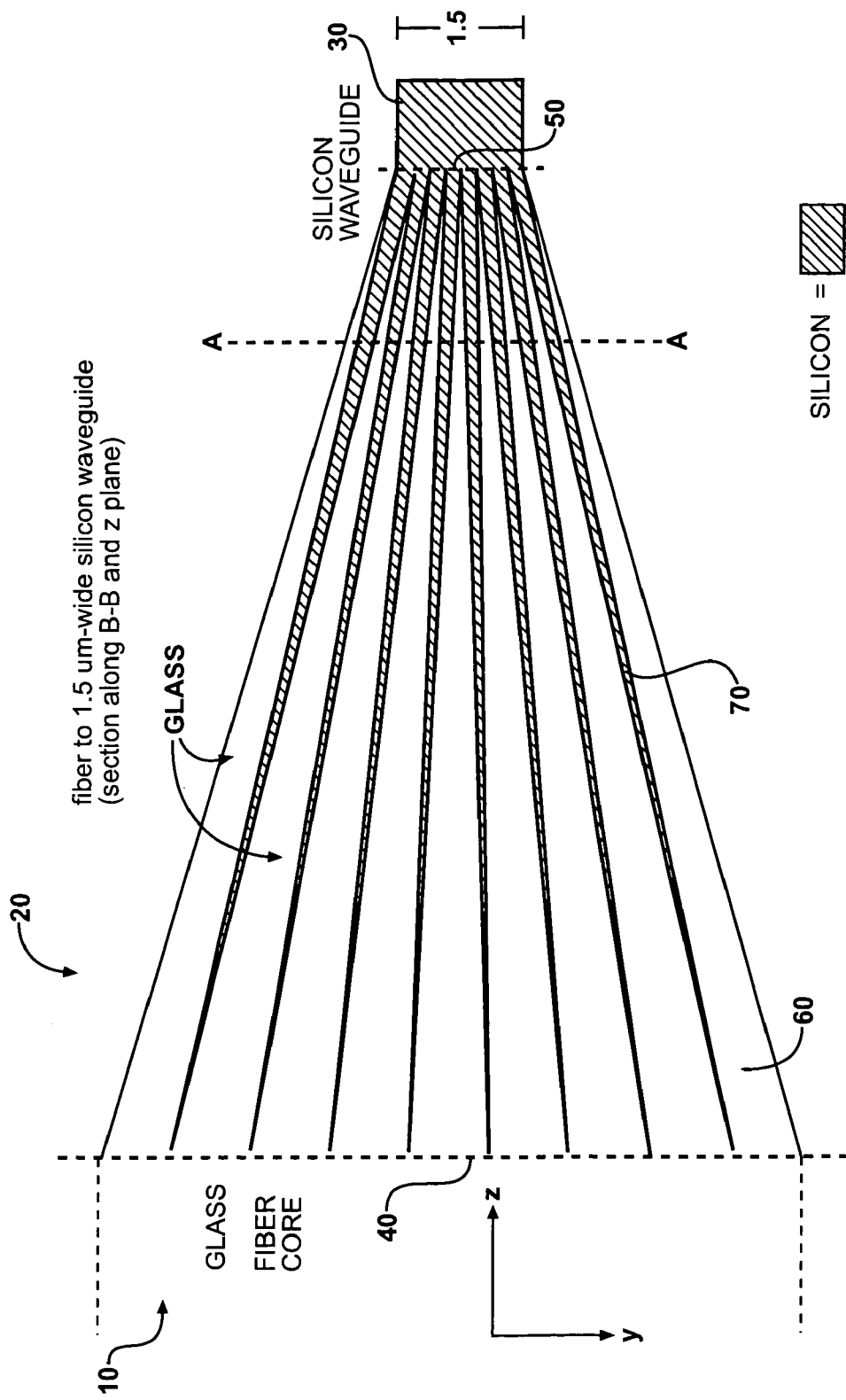
FIG. 3. Top view of a coupling device comprising silicon and glass and interconnected to an optical fiber and a silicon waveguide.

FIG. 3 is a top view of a cross-section of the device in the yz-plane. It shows a central cross-section of the coupling device that corresponds to the perpendicular plane containing line B—B shown in FIG. 2. Fiber core 10, input end 40, output end 50, and planar silicon waveguide 30 are shown in FIG. 3. Also shown are glass regions 60 and silicon regions 70 of the coupling device. This perspective view shows the discrete nature of the silicon regions along the length of the coupling device. The discrete silicon regions have a form characteristic of a fiber or a filament and may be referred to herein as fiber regions or filamentary regions. The perspective shown in FIG. 3 shows the tapered shape of the coupling device 20 and the decrease in cross-section of the coupling device 20 that occurs in the y-dimension in the z-direction. As the cross-section decreases, the optical signal is confined in an increasingly smaller space. As the confinement increases, the effective permittivity of the coupling device increases as the filamentary silicon regions 70 widen and the glass regions 60 narrow.

The increase in effective permittivity that occurs as the cross-section of the coupling device 20 decreases in the z-direction is a result of the increasing fill factor of the silicon regions 70 that occurs in the z-direction between the input and output ends. The effective permittivity of the coupling device is a local function of the effective permittivity of the material or materials that make up the device. When two or more materials are present, the local effective permittivity is an average (over a length scale approximating the wavelength of the optical signal) of the permittivities of the individual materials.

At the input end 40, the cross-section of the coupling device is as shown in FIG. 2 and the fill factor of the glass 60 in the cross-sectional area greatly exceeds the fill factor of the silicon regions 70. As a result, the effective permittivity of the coupling device at the input end is very close to that of the glass. At the output end 50, the situation is reversed and the output cross-section has a fill factor of the silicon regions 70 that is much higher than the fill factor of the glass regions 60. As a result, the effective permittivity at the output end is very close to that of silicon. The effective permittivity increases continuously from the input end to the output end of the coupling device as the fill factor of silicon increases and compensates in whole or in part for the impedance change that occurs as a result of the tapering of the device. The extent of the compensation can be varied through control of factors such as the change in effective permittivity or fill factors per unit length of the coupling device, choice of dielectric materials, the tapering angle of the coupling device, the length of the coupling device and the shape of the cross-section of the coupling device. Losses due to propagation of an optical signal through the device can be eliminated or minimized by varying these features of the coupling device in the context of the instant invention.

Figure 4:
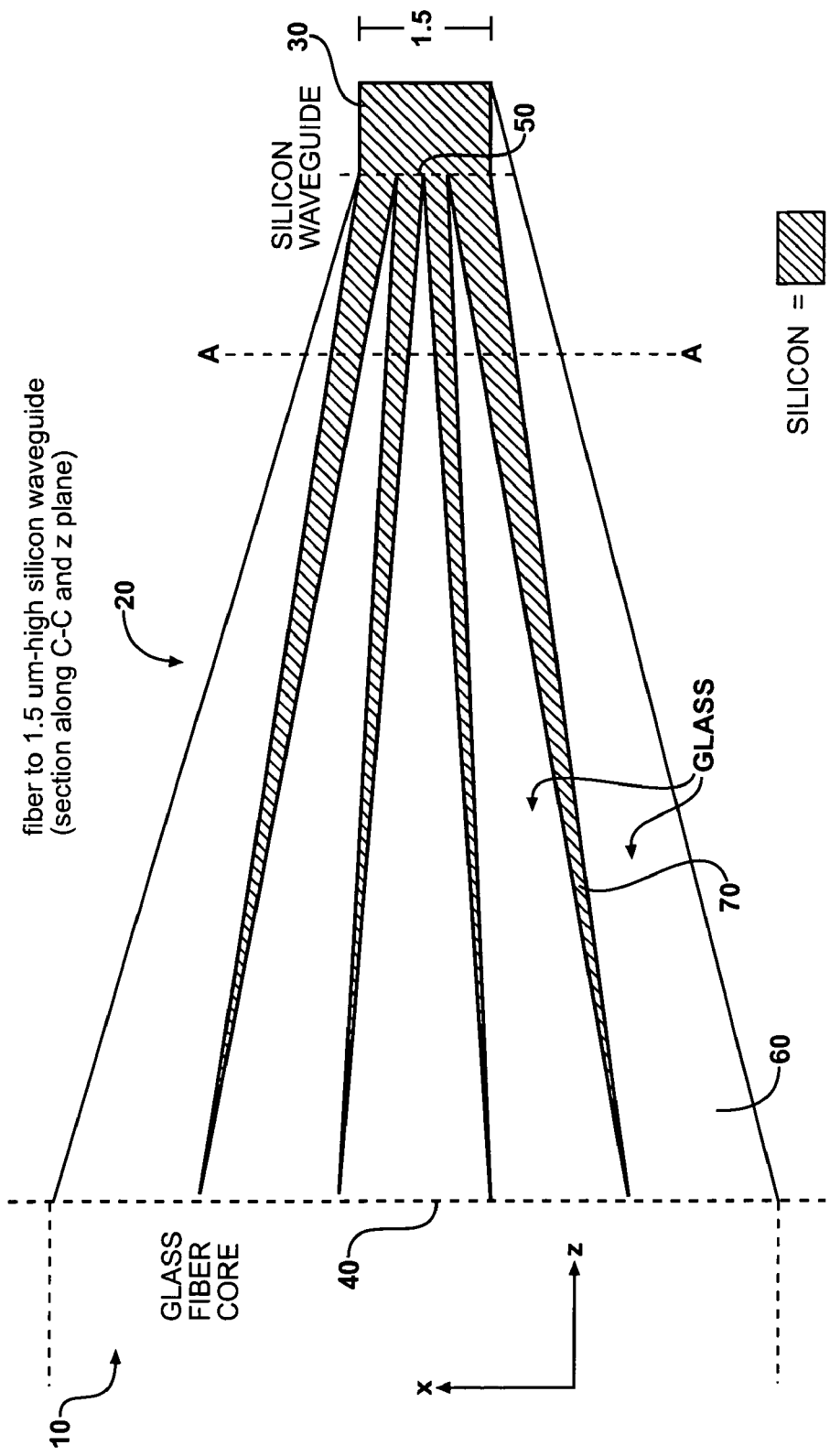
FIG. 4. Side view of a coupling device comprising silicon and glass and interconnected to an optical fiber and a silicon waveguide.

FIG. 4 shows a side view of the coupling device of this example. The side view is a cross-sectional view corresponding to a plane perpendicular to the end view shown in FIG. 2 that contains reference line C—C indicated therein. Fiber core 10, input end 40, output end 50, planar silicon waveguide 30, glass regions 60 and silicon regions 70 of the coupling device 20 are shown. The perspective shown in FIG. 4 shows the tapered shape of the coupling device 20 and the decrease in cross-section of the coupling device 20 that occurs for the x-dimension in the z-direction. As the cross-section decreases, the optical signal is confined in an increasingly smaller space. As the confinement increases, the effective permittivity of the coupling device increases as the silicon regions 70 widen and the glass regions 60 narrow due to the changing fill factors of the silicon regions 70 and glass regions 60 as described above.

The coupling device of this example couples a glass fiber with a silicon waveguide and does so with a structure that has high acceptance of the optical signal from a glass fiber at the input end, high acceptance of the optical signal by the silicon waveguide at the output end, close impedance matching with the glass fiber core at the input end, close impedance matching with the silicon waveguide at the output end along with a tapered shape and varying effective permittivity within the coupling device that provides constant or nearly constant impedance for the optical signal as it passes through the coupling device. Embodiments in which the central axes of the transmitting element, coupling device and receiving element are aligned are within the scope of the instant invention as are embodiments in which the transmitting element, coupling device and receiving elements have a boundary aligned in a common plane. It is to be appreciated that other alignments follow analogously and are within the scope of the instant invention.

EXAMPLE 2

In this example, a coupling device for a planar integrated optical element is described. The device of this example provides coupling of an optical fiber having a glass core region with a silicon slab waveguide where the central axis of the fiber is not aligned with the central axis of the waveguide. More specifically, the coupling device of this example permits the efficient transfer of an optical signal from a fiber to a waveguide where the fiber and waveguide have a boundary that lie in a common plane. Such a configuration is desirable, for example, in integrated optical elements in which all-planar structures are used. In these structures, individual elements of an optical circuit are deposited or otherwise placed on a common surface and it is desirable to route optical signals from one device to another.

Figure 5:
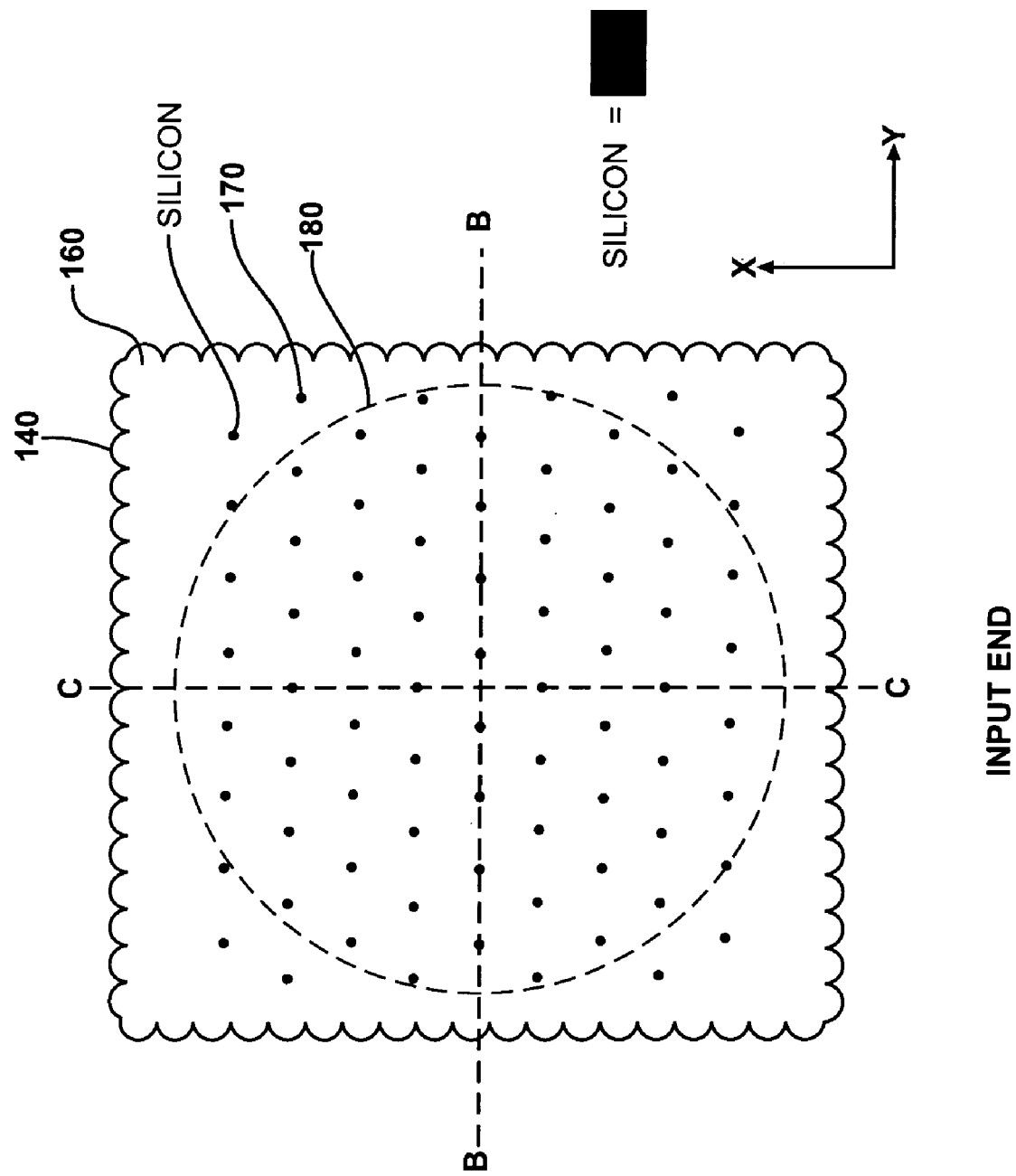
FIG. 5. Input cross-section of a coupling device comprising silicon and glass.

The optical fiber and silicon waveguide are as described in Example 1 hereinabove and the coupling element of this example includes two dielectric materials: glass and silicon. The end view of the input end of the coupling device of this example is shown in FIG. 5. FIG. 5 shows an end view of the input end 140. The end view corresponds to the input cross-section of the coupling device. The input cross-section includes a glass region 160 having interspersed silicon regions 170 contained therein. The fill area of the silicon regions 170 in the input cross-section 140 has a square shape. Also shown is an outline 180 of the fiber core. The substantial spatial overlap of the input cross-section of the coupling device with the fiber core permits high acceptance of the optical signal by the coupling device. The x-direction and y-direction are as indicated in FIG. 5 and the z-direction is the direction perpendicular to the page.

Figure 6:
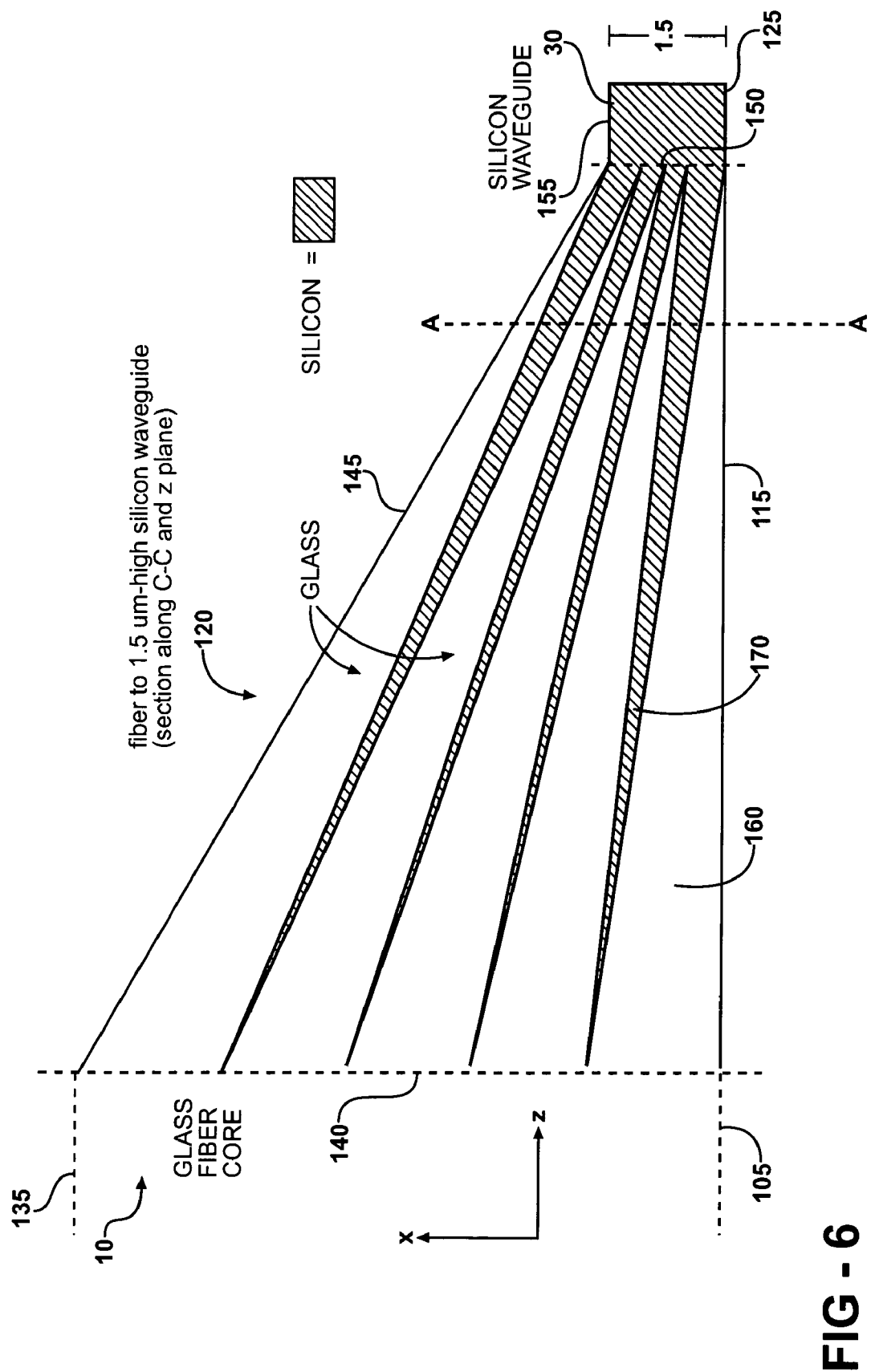
FIG. 6. Side view of a coupling device comprising silicon and glass and interconnected to an optical fiber and a silicon waveguide.

Of particular relevance in this example is the side view shown in FIG. 6, which corresponds to the cross-sectional view obtained for a plane containing the line C—C and perpendicular to the end view of FIG. 5. The x-directions and z-directions are as indicated in FIG. 6. The side view includes fiber core 10, input end 140, output end 150, planar silicon waveguide 30, glass regions 160 and silicon regions 170 of the coupling device 120. The discrete and filamentary nature of the silicon regions 170 in the example is revealed in the figure. The side view also shows bottom surface 105 and top surface 135 of the fiber core, bottom surface 115 and top surface 145 of the coupling device, and bottom surface 125 and top surface 155 of the waveguide. In this embodiment, the bottom surfaces 105, 115 and 125 are aligned and lie in a common plane, while top surface 135 of the fiber core and top surface 155 of the waveguide are not aligned. Top surface 145 of the coupling device tapers from top surface 135 of the fiber core to top surface 155 of the waveguide.

In this embodiment, the fill factor of silicon regions 170 increases in the direction extending from input end 140 to output end 150. As described hereinabove, since the permittivity of silicon regions 170 is higher than the permittivity of glass regions 160, an increasing fill factor of silicon corresponds to an increase in the effective permittivity of the coupling device. The increased effective permittivity contributes to a decrease in effective impedance that offsets or partially offsets the increase in effective impedance that accompanies the decrease in the cross-section of the coupling device between its input end 140 and output end 150.

EXAMPLE 3

In this example, an embodiment of a coupling device that includes silicon and air as the dielectric materials is considered. As in EXAMPLES 1 and 2 hereinabove, the coupling device in this example interconnects an optical fiber and a planar waveguide where, for example, the glass core of the fiber has a refractive index of about 1.45 and a diameter of about 9 μm and the silicon slab waveguide has a width of about 1.5 μm and a refractive index of about 3.4 with a square or rectangular cross-section. In this example, light is propagating from the fiber through the coupling device into the waveguide so that the input end of the coupling device is connected to the fiber and the output end of the coupling device is connected to the waveguide. The coupling device has a tapered shape in which the cross-sectional area encountered by a propagating optical signal decreases between the input end and output end. In this example, the central axis of the fiber is aligned with a central axis of the waveguide.

Figure 7:
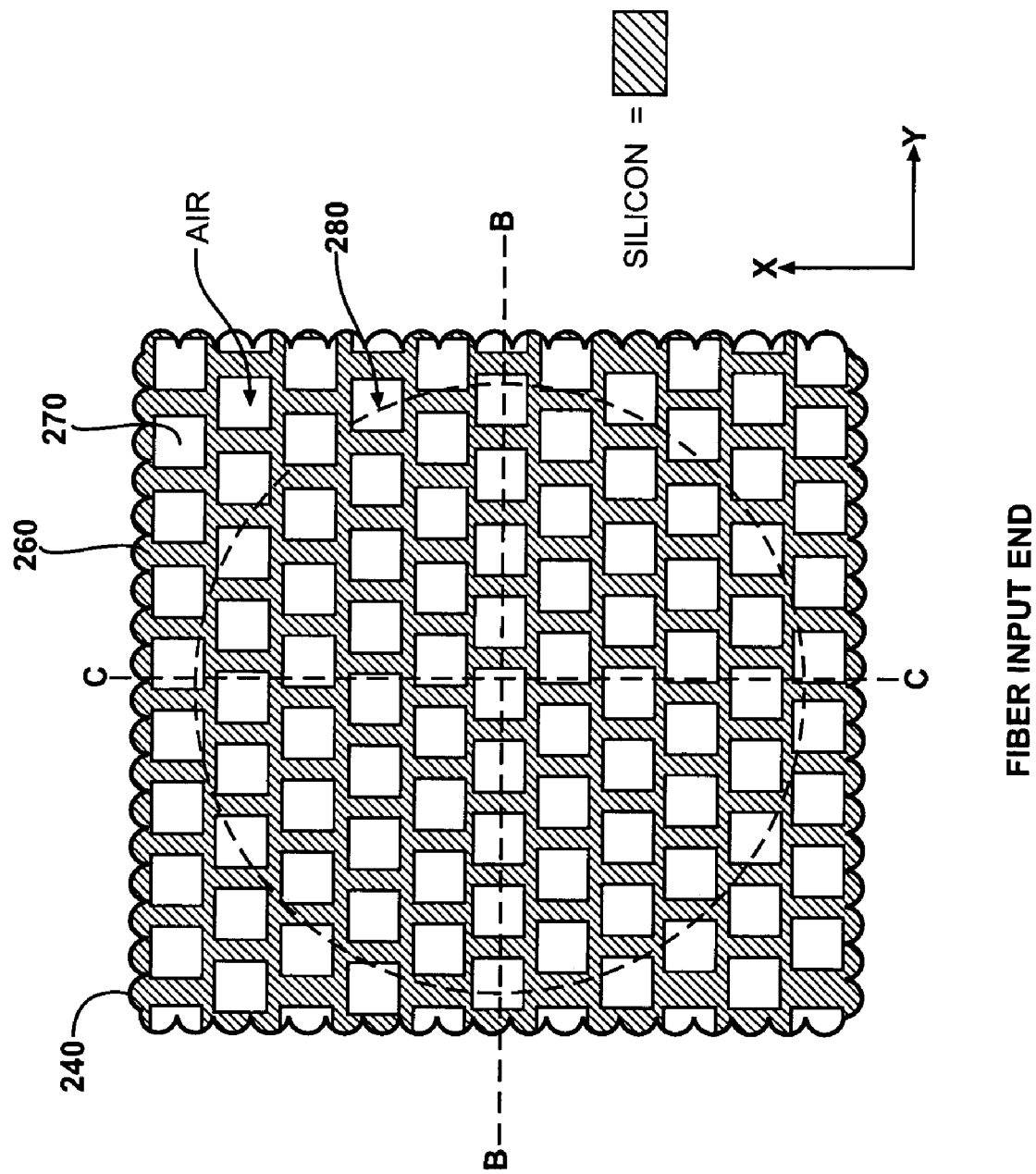
FIG. 7. Input cross-section of a coupling device comprising silicon and air.

FIG. 7 shows the input cross-section of the coupling device of this embodiment. The input cross-section 240 includes silicon regions 260 having interspersed air regions 270 contained therein. In this example, the air regions 270 are discrete regions that have a fill area in the input cross-section that has a square shape. Also shown is an outline 280 of the fiber core. The substantial spatial overlap of the input cross-section of the coupling device with the fiber core permits high acceptance of the optical signal by the coupling device. The x-, y- and z-directions as well as the reference lines B—B and C—C are as described hereinabove in reference to FIG. 2.

Close impedance matching of the fiber and the coupling device at the input end is achieved in this embodiment by controlling the fill factor of the silicon regions 260 in such a way that the effective permittivity of the input end resulting from an averaging over the silicon regions 260 (which have a higher permittivity than the glass fiber core) and the air regions 270 (which have a lower permittivity than the glass fiber core) closely matches the permittivity of the glass fiber core. The combination of similar permittivity and high spatial overlap insures close impedance matching and high acceptance at the input end. Losses at the junction between the fiber and coupling device are thereby minimized.

Figure 8:
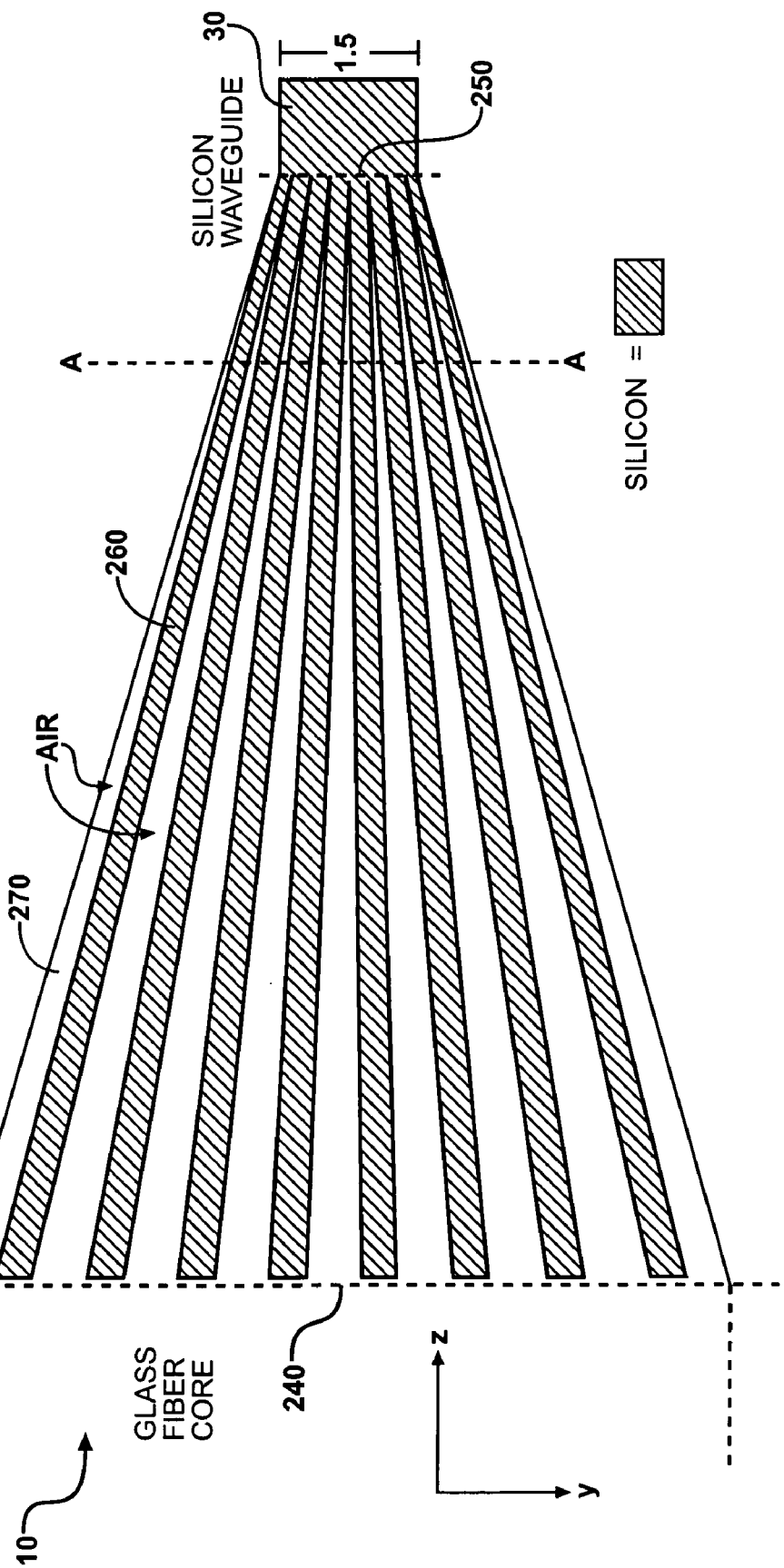
FIG. 8. Top view of a coupling device comprising silicon and air and interconnected to an optical fiber and a silicon waveguide.

FIG. 8 is a top view of a cross-section of the device in the yz-plane. It shows a central cross-section of the coupling device that corresponds to the perpendicular plane containing line B—B shown in FIG. 7. Fiber core 10, input end 240, output end 250, and planar silicon waveguide 30 are shown in FIG. 8. Also shown are air regions 270 and silicon regions 260 of the coupling device. The discrete and filamentary nature of the air regions 270 within the silicon regions 260 in this example is evident in FIG. 8. The perspective shown in FIG. 8 shows the tapered shape of the coupling device 220 and the decrease in cross-section of the coupling device 220 that occurs in the y-dimension in the z-direction. As the cross-section decreases, the optical signal is confined in an increasingly smaller space. As the confinement increases, the effective permittivity of the coupling device increases as the fill factor of the silicon regions 260 increases, while the fill factor of the glass regions 270 decreases in the direction extending from the input end 240 to the output end 250. At output end 250, the fill factor of the silicon regions 260 approaches one and the fill factor of the air regions 270 approaches zero so that the effective permittivity at the output end 250 closely matches that of silicon waveguide 30. The effective permittivity increases continuously from the input end 240 to the output end 250 of the coupling device as the fill factor of silicon increases. The increase in effective permittivity compensates in whole or in part for the impedance change that occurs as a result of the tapering of the device. Losses due to propagation of an optical signal through the device are thereby minimized.

Figure 9:
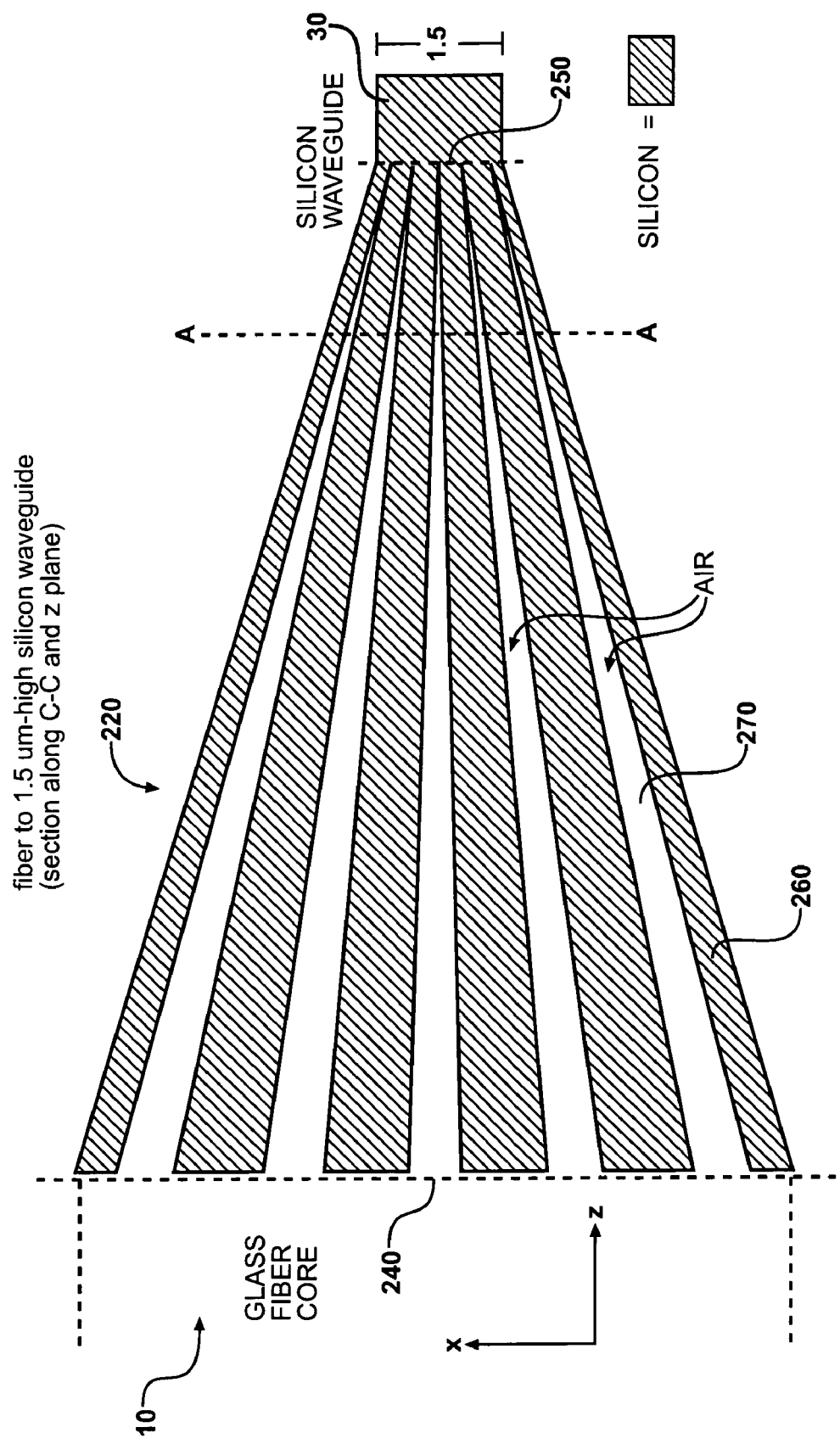
FIG. 9. Side view of a coupling device comprising silicon and air and interconnected to an optical fiber and a silicon waveguide.

FIG. 9 shows a side view of the coupling device of this example. The side view is a cross-sectional view corresponding to a plane perpendicular to the end view shown in FIG. 7 that contains reference line C—C indicated therein. Fiber core 10, input end 240, output end 250, planar silicon waveguide 30, silicon regions 260 and air regions 270 of the coupling device 220 are shown. The perspective shown in FIG. 9 shows the tapered shape of the coupling device 220 and the decrease in cross-section that occurs for the x-dimension in the z-direction. As the cross-section decreases, the optical signal is confined in an increasingly smaller space. As the confinement increases, the effective permittivity of the coupling device increases as the fill factor of the silicon regions 260 increases and the fill factor of the air regions 270 decreases as described hereinabove.

Figure 10:
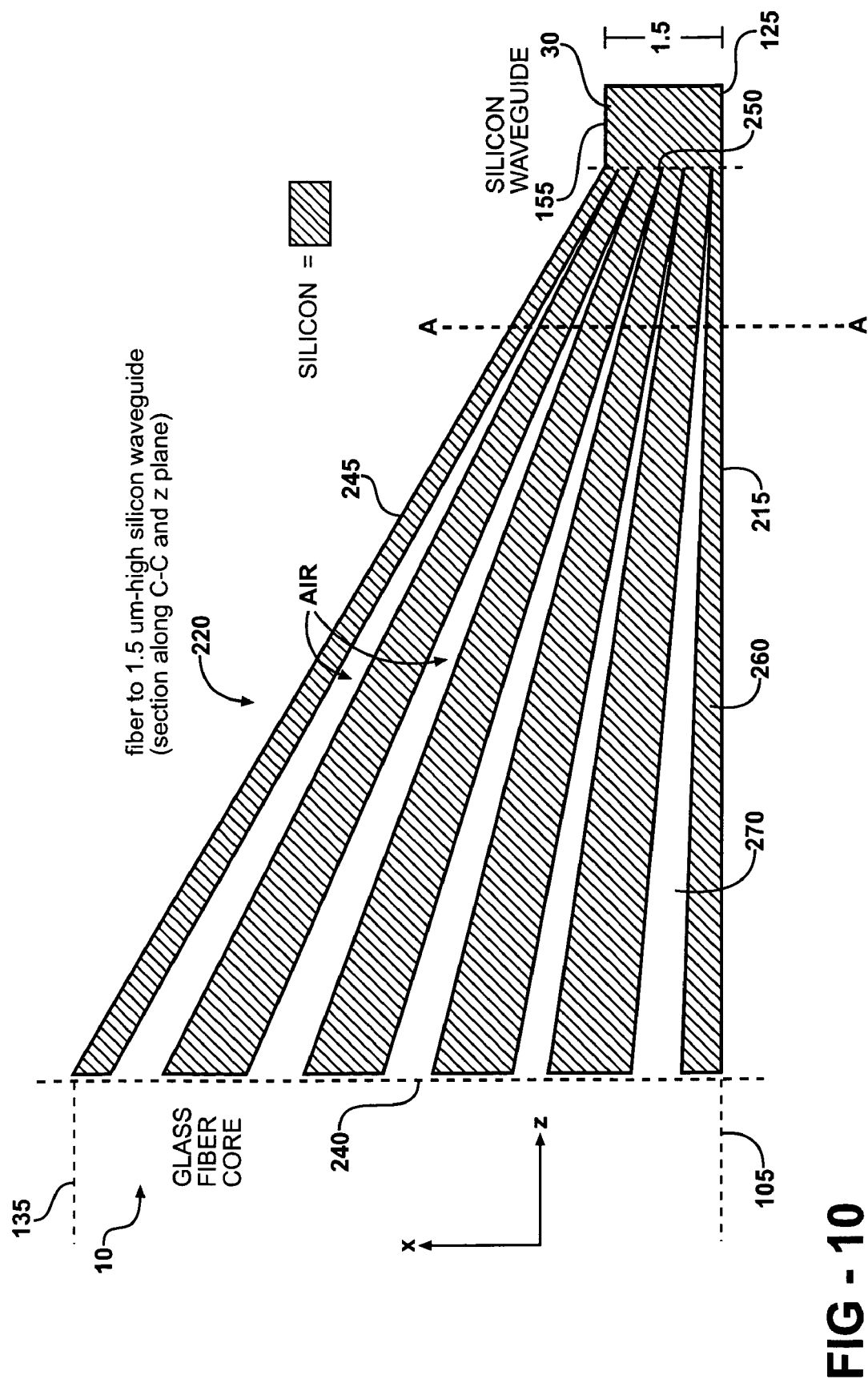
FIG. 10. Side view of a coupling device comprising silicon and air and interconnected to an optical fiber and a silicon waveguide.

Analogous to the embodiment described in EXAMPLE 2 hereinabove, the coupling device of this example can also couple to a waveguide in such a way that the transmitting fiber element, the coupling device and the receiving silicon waveguide have a boundary lying in a common plane. In such an embodiment, a coupling device comprised of silicon and air having an input cross-section as shown in FIG. 7 and a side view as shown in FIG. 10 may be used. The side view corresponds to the cross-sectional view obtained for a plane containing reference line C—C that is perpendicular to the end view of FIG. 7. The x-directions and z-directions are as indicated in FIG. 10. The side view includes fiber core 10, input end 240, output end 250, planar silicon waveguide 30, silicon regions 260 and air regions 270 of the coupling device 220. The side view also shows bottom surface 105 and top surface 135 of the fiber core, bottom surface 215 and top surface 245 of the coupling device, and bottom surface 125 and top surface 155 of the waveguide 30. In this embodiment, the bottom surfaces 105, 215 and 125 are aligned and lie in a common plane, while top surface 135 of the fiber core and top surface 155 of the waveguide are not aligned. Top surface 245 of the coupling device tapers from top surface 135 of the fiber core to top surface 155 of the waveguide.

The coupling device of this example couples a glass fiber with a silicon waveguide and does so with a structure that has high acceptance of the optical signal from a glass fiber at the input end, high acceptance of the optical signal by the silicon waveguide at the output end, close impedance matching with the glass fiber core at the input end, close impedance matching with the silicon waveguide at the output end along with a tapered shape and varying effective permittivity within the coupling device that provides constant or nearly constant impedance for the optical signal as it passes through the coupling device. Embodiments in which the central axes of the transmitting element, coupling device and receiving element are aligned are within the scope of the instant invention as are embodiments in which the transmitting element, coupling device and receiving elements have a boundary aligned in a common plane. It is to be appreciated that other alignments follow analogously and are within the scope of the instant invention.

Foregoing Examples 1, 2 and 3 have considered various embodiments of the instant coupling devices and alignment schemes of the devices relative to external elements. These examples have illustrated input and output cross-sections of the instant coupling devices. It was shown that impedance matching at the input end is improved when the effective permittivity of the instant coupling device matches or closely matches the effective permittivity of the transmitting element (e.g. fiber core) and that impedance matching at the output end is improved when the effective permittivity of the instant coupling device matches or closely matches the effective permittivity of the receiving element (e.g. silicon waveguide).

One way to achieve these conditions is to construct a coupling device from two dielectric materials, one of which corresponds to the material of the waveguiding material of the transmitting device and the other of which corresponds to the waveguiding material of the receiving device. In such an embodiment, the input cross-section of the coupling device comprises primarily the waveguiding material of the transmitting element and the output cross-section of the coupling device comprises primarily the waveguiding material of the receiving element. In a limiting case of perfect impedance matching, the fill factor of the waveguiding material of the receiving element approaches zero at the input end and the fill factor of the waveguiding material of the transmitting element approaches zero at the output end. In cross-sections within the interior of the coupling element, both materials have appreciable fill factors.

Another way of achieving the desired impedance matching conditions at the input and output ends is to construct a device from two dielectric materials, where one or both of the materials corresponds to neither the waveguiding material of the transmitting element nor the waveguiding material of the receiving element, but where the particular materials chosen and their fill factors at the input and output ends are designed so that the effective permittivity at the input cross-section closely matches that of the transmitting element and the effective permittivity of the cross-section at the output end closely matches that of the receiving element.

EXAMPLE 4

In the foregoing examples, representative input and output cross-sections are shown and conditions relevant to the efficient transfer of an optical signal from a transmitting device to a receiving device via the instant coupling device are described. In this example, the cross-sectional shape of one or more dielectric materials within the instant coupling device in the direction of propagation of the optical signal is considered.

The conditions described hereinabove for conserving impedance along the length of the coupling device are based on a compensation of effects resulting from the variation in the cross-sectional geometry of the coupling device through tapering to adjust the physical dimensions in which the optical signal is confined from a size comparable to the transmitting device to a size comparable to the receiving device by a compensating change in effective permittivity through a variation in the fill factor of one or more of the constituent dielectric materials in the direction of the taper. In this example, representative internal cross-sections of the instant coupling devices are considered and embodiments are shown in which the state of polarization of an optical signal can be varied as it propagates through the instant coupling device. As used herein, an internal cross-section is a cross-section of the instant coupling device other than the input cross-section and the output cross-section. An internal cross-section is thus a cross-section away from the input end or output end of the device.

In one embodiment herein, the fill factor of an interspersed dielectric material varies in the direction of propagation of light in such a way that the fill size of the regions of the dielectric material in the internal cross-sections along the device changes while maintaining a constant fill shape. As used herein, fill size refers to a characteristic size or length or dimension of the fill shape of the fill area or a discrete or filamentary region. Examples of fill size include the length of a square fill shape, the length or width of a rectangular fill shape, the diameter of a circular or elliptical fill shape, the height or base of a triangular fill shape etc.

As an example of such an embodiment, we may consider the coupling device discussed in EXAMPLE 3 hereinabove where the input cross-section, top view, and side view are as shown in FIGS. 7, 8, and 9 (or 10), respectively. As seen in FIG. 7, the input cross-section includes discrete air regions 270 that are periodically distributed within the input cross-section where the individual air regions have a square fill shape. As described hereinabove, the fill factor of the air regions decreases in the direction of the output end of the device so that the effective permittivity increases and approaches that of the silicon slab waveguide receiving device considered in EXAMPLE 3. In this embodiment, the decrease in the fill factor of the air regions is accomplished through a reduction in the characteristic fill size, the side length, of the fill area of the air regions while maintaining a fill shape that is square so that internal cross-sections also include periodically arranged air regions having a square fill shape, but where the squares are smaller in dimension (smaller fill size) and collectively provide a smaller fill factor for air in the direction of propagation of an optical signal through the device.

Figure 11:
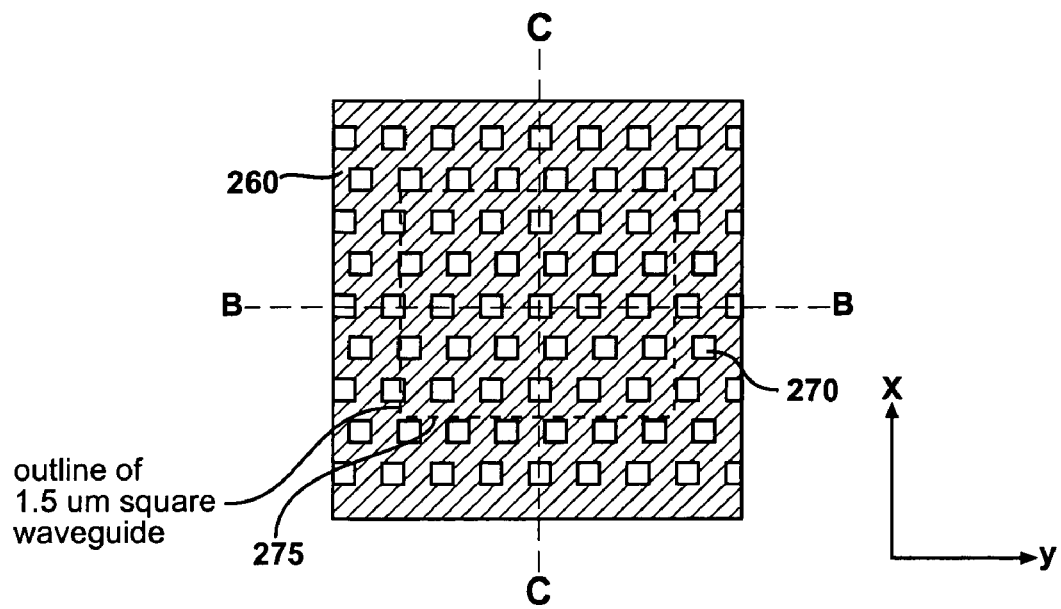
FIG. 11. Internal cross-section of a coupling device comprising silicon and air and interconnected to an optical fiber and a silicon waveguide.
Figure 12:
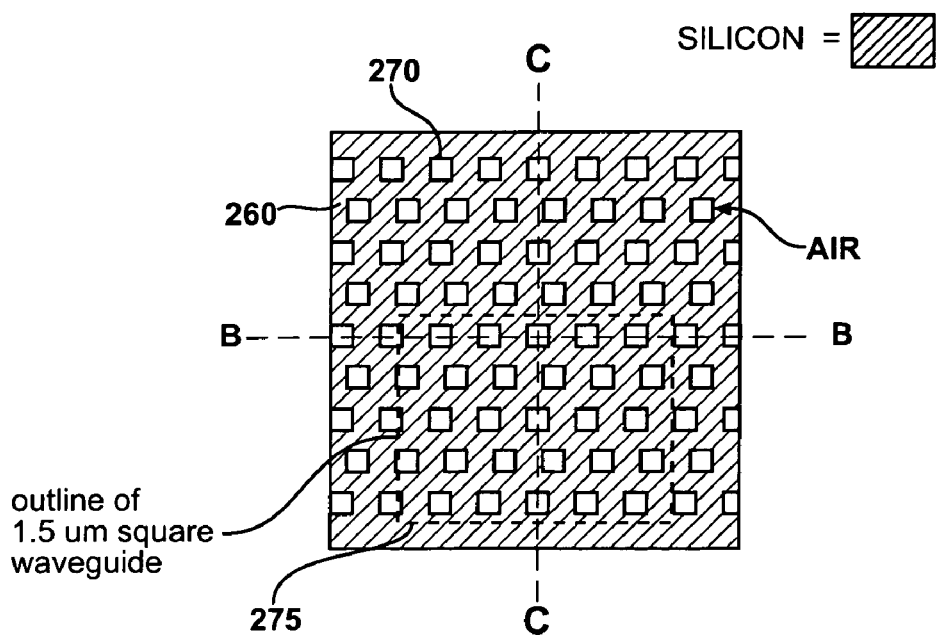
FIG. 12. Internal cross-section of a coupling device comprising silicon and air and interconnected to an optical fiber and a silicon waveguide.
Figure 13:
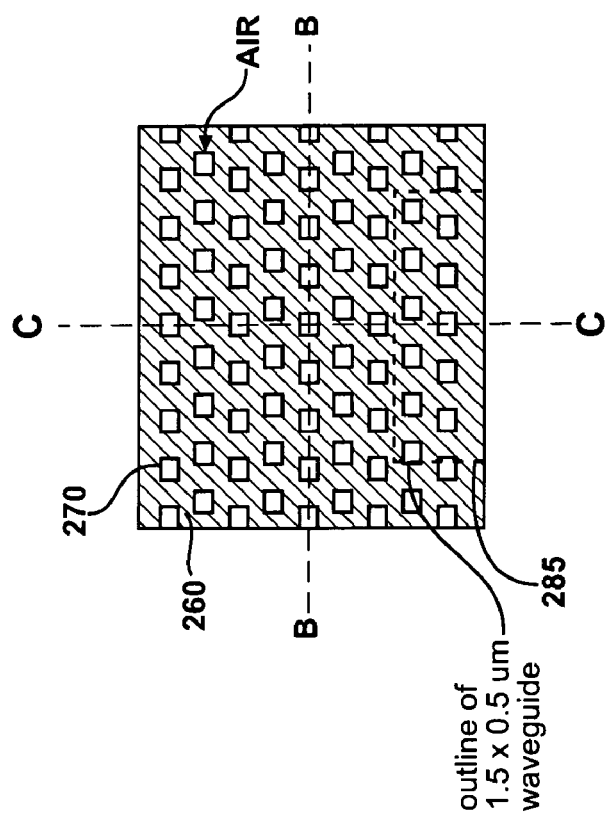
FIG. 13. Internal cross-section of a coupling device comprising silicon and air and interconnected to an optical fiber and a silicon waveguide.
Figure 14:
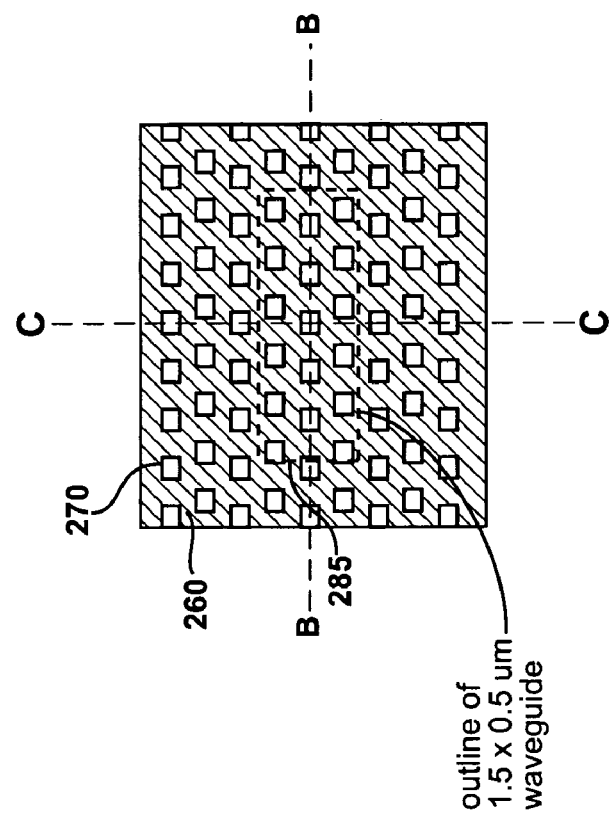
FIG. 14. Internal cross-section of a coupling device comprising silicon and air and interconnected to an optical fiber and a silicon waveguide.

Illustrations of an internal cross-section according to this embodiment are presented in FIGS. 11–14. FIG. 11 shows an internal cross-section of a coupling device described in EXAMPLE 3 hereinabove. The device has an input cross-section as shown in FIG. 7, a top view as shown in FIG. 8, and a side view as shown in FIG. 9. The internal cross-section shown in FIG. 11 corresponds to the cross-section indicated by reference line A—A shown in FIG. 9. The cross-section is an xy-plane cross-section selected at an internal position within the coupling device. The reference directions B—B and C—C shown in FIG. 11 correspond to the B—B and C—C directions shown for the input cross-section of FIG. 7. Air regions 270 and glass regions 260 are shown. Also shown is an outline 275 of the receiving element. In the embodiment of FIG. 11, the receiving element is a silicon slab waveguide having a square cross-section with a side length of 1.5 µm and a centered alignment with respect to the central axis of the coupling device. The overall cross-sectional area of the internal cross-section is larger than that of the receiving element and output cross-section of the coupling device since it corresponds to an intermediate position between the input and output ends of the tapered device. When compared with the input cross-section shown in FIG. 7, the internal cross-section shown in FIG. 11 is seen to have a smaller overall cross-sectional area due to the tapering of the coupling device. The air regions 270 remain periodically arranged and maintain a fill area having a square fill shape, but the side length of the square (fill size) has been reduced and the collective fill factor of the air regions within the internal cross-section has also been reduced so that the effective permittivity of the internal cross-section is higher than in the input cross-section. FIG. 12 is a similar internal cross-section for an embodiment as described in EXAMPLE 3 in which the coupling device and receiving element have a boundary that share a common plane. The embodiment of FIG. 12 has the input cross-section shown in FIG. 7, the top view shown in FIG. 8, and the side view shown in FIG. 10. FIGS. 13 and 14 show internal cross-sections for additional embodiments in which the receiving element 285 is a silicon slab waveguide having a rectangular cross-section of dimensions 1.5 µm×0.5 µm.

In the embodiments of this example, the air regions have a fill area having a square fill shape in the input cross-section, maintain a square fill shape in internal cross-sections and retain a square fill shape at the output cross-section. The air regions are thus seen as filaments that traverse the coupling device where the filaments have a square cross-section that decreases in side length in a direction of propagation extending from the input end of the coupling device to the output end. The cross-section of the air regions is thus symmetric and not expected to bias or modify the polarization of a propagating optical signal in a particular way. Any influence of the coupling device on the state of polarization of an optical signal is expected to be random so that no particular state of defined polarization (e.g. TE or TM) is provided to the receiving element.

Also within the scope of this example are embodiments in which the symmetric cross-section of the filaments is circular or a combination of circular and square.

EXAMPLE 5

In this example, embodiments are considered in which the fill shape of discrete filamentary regions of an interspersed dielectric material in the instant coupling device varies between the input end and the output end of the coupling device and how the number, size, arrangement and/or shape of the regions of the two or more dielectric materials in the instant coupling devices provide degrees of freedom in controlling the state of polarization of the optical signal.

When an optical signal propagates in an optical fiber, the general situation is that the polarization state of the signal is slowly randomized over time and space. As a result, while the optical signal may not be unpolarized, it may have an unknown state of elliptical polarization. In some applications of the instant coupling devices, the state of polarization of the optical signal is not an important consideration and the optical signal provided by a fiber to the input end of the instant coupling device propagates through the device without a deliberate modification of its state of polarization and is transmitted to the receiving element in a random or uncontrolled state of polarization.

In other applications, it is desirable to control the state of propagation of an optical signal as it propagates through a coupling device. Oftentimes, for example, the receiving element supports an optical mode having a particular state of polarization and it is preferable to provide a signal having that state of polarization to maximize transfer efficiency. Silicon slab waveguides, for example, often transmit light having a TE or TM polarization more efficiently than randomly or unpolarized light. In this example, embodiments are presented in which the polarization of an optical signal is controlled through variations in the fill shape of filamentary regions within the coupling device. More specifically, the fill shape of one or more filamentary regions is varied from a shape having a higher symmetry to a shape having lower symmetry to produce an optical signal at the output end of the coupling device that has a state of polarization that is biased toward the longer dimension of the lower symmetry fill shape.

Figure 15:
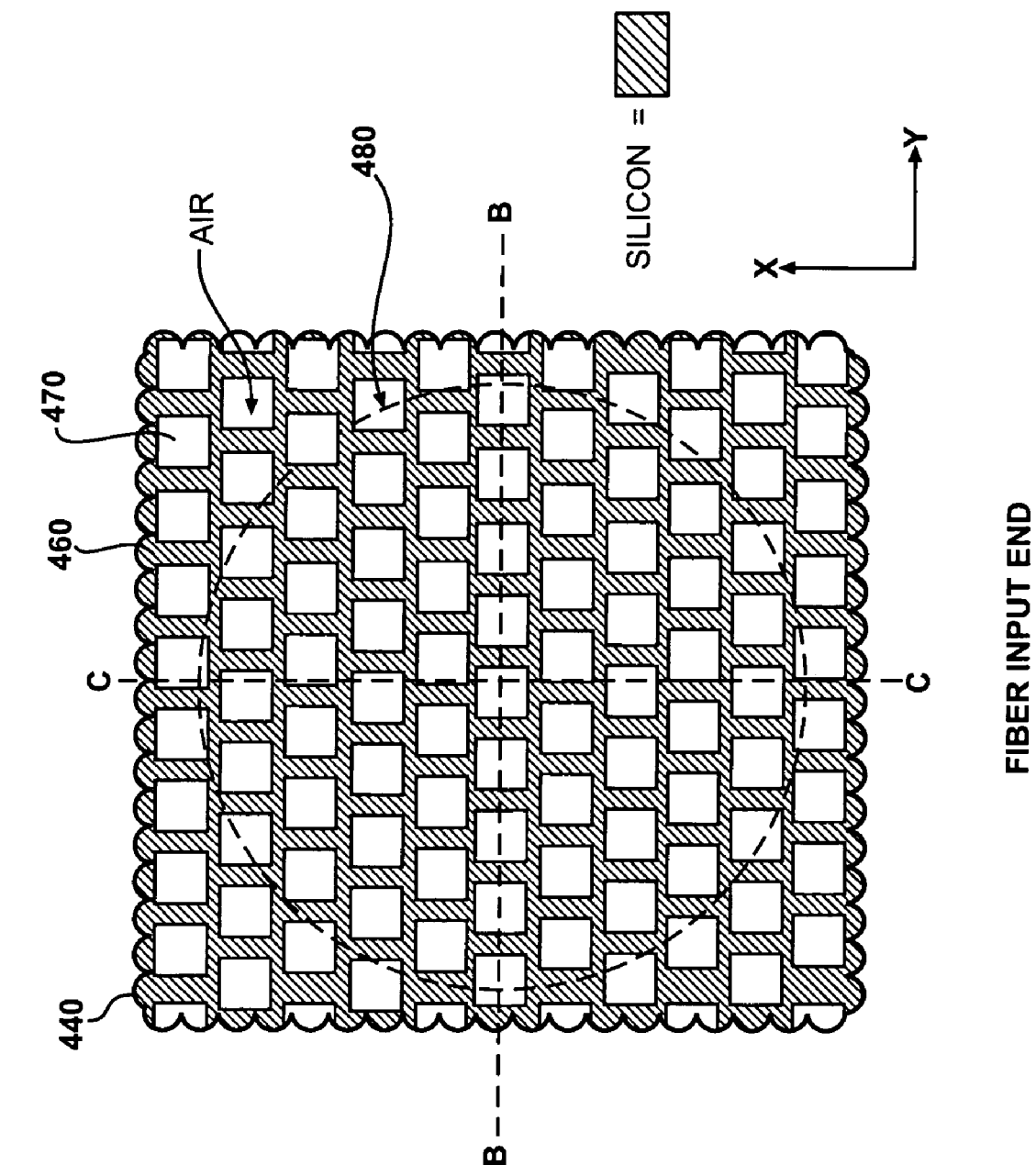
FIG. 15. Input cross-section of a coupling device comprising silicon and air.

To illustrate the principle of polarization bias, we consider a coupling device comprised of air and silicon as dielectric materials, where the device interconnects an optical fiber and a planar waveguide as described hereinabove. The input cross-section is as described hereinabove in connection with FIG. 7 and is shown in FIG. 15. The input cross-section 440 includes silicon regions 460 having interspersed discrete air regions 470 having a square fill shape contained therein. The air regions of this example are filamentary. Also shown is an outline 480 of the fiber core of the transmitting element. The substantial spatial overlap of the input cross-section of the coupling device with the fiber core permits high acceptance of the optical signal by the coupling device. The x-, y- and z-directions as well as the reference lines B—B and C—C are as described in EXAMPLES 1–4 hereinabove. As in the embodiments of EXAMPLE 4, the cross-section of the air regions shown in FIG. 15 is square.

Figure 16:
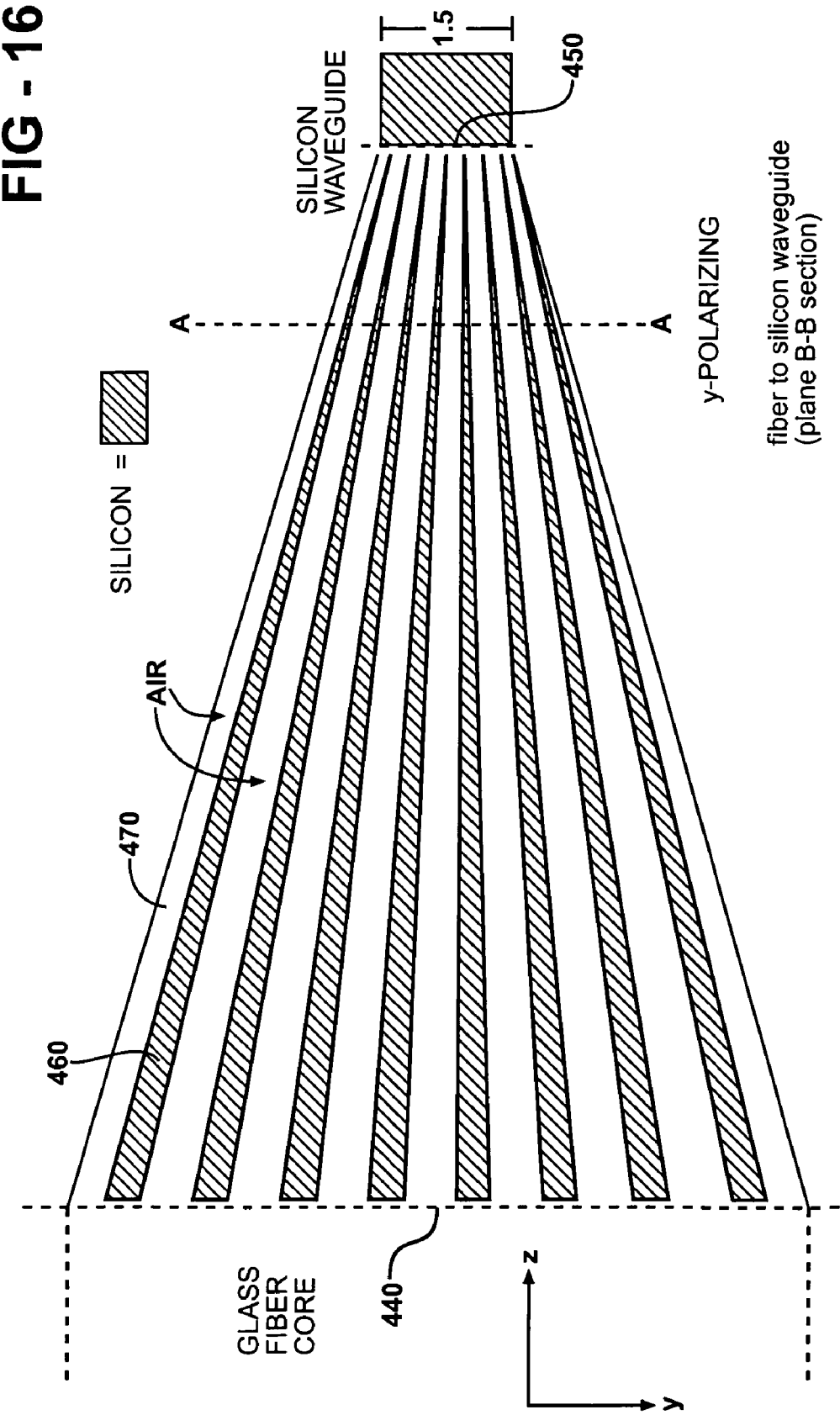
FIG. 16. Top view of a coupling device comprising silicon and air and interconnected to an optical fiber and a silicon waveguide.

A top view of the coupling device, corresponding to a plane perpendicular to the input end and containing reference line B—B, of this embodiment is shown in FIG. 16. The device couples a fiber having a glass core to a silicon slab waveguide. Input cross-section 440, output cross-section 450, silicon regions 460 and filamentary air regions 470 are indicated. The top view shows an elongation, relative to the surrounding silicon regions, of the air regions 470 in the y-direction. A useful comparison can be made between FIG. 8, which shows the corresponding top view for an embodiment in which the air regions maintain a square fill shape without an elongation. The elongated air regions 470 occupy an increasing portion of the linear dimension in the y-direction relative to the silicon regions 460 in FIG. 16 and also relative to the air regions 270 in FIG. 8.

Figure 17:
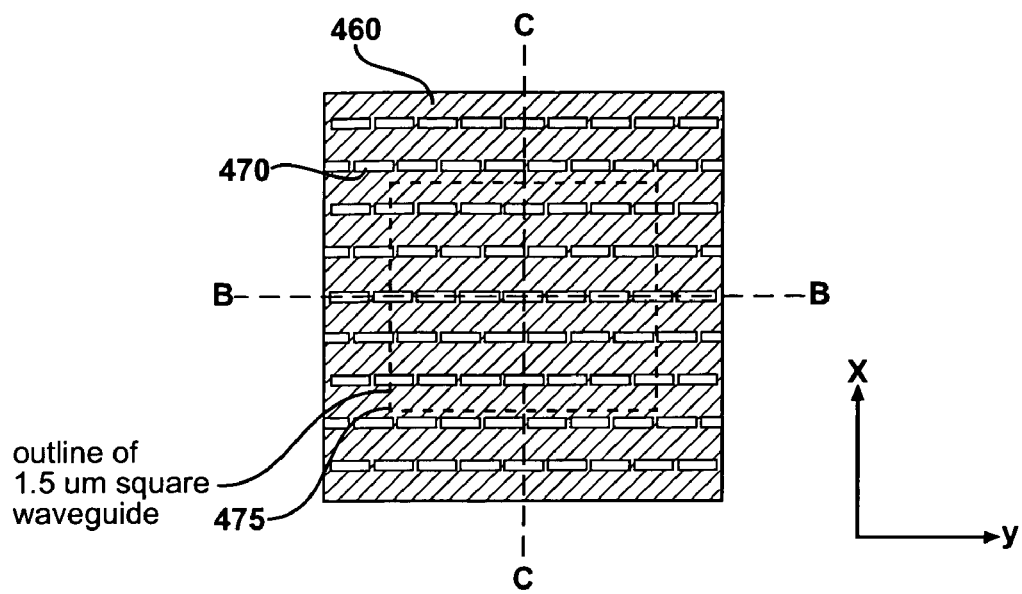
FIG. 17. Internal cross-section of a coupling device comprising silicon and air and interconnected to an optical fiber and a silicon waveguide.

FIG. 17 shows an internal cross-section corresponding to the position indicated by reference line A—A in FIG. 16.

The cross-section is an xy cross-section and is an embodiment in which the central axis of the coupling device is aligned with the central axis of the receiving silicon slab waveguide. An outline 475 of a 1.5 µm×1.5 µm square silicon waveguide is indicated along with silicon regions 460 and discrete air regions 470. From this perspective view, the elongation of the air regions 470 in the y-direction relative to the x-direction is evident. The relative narrowing of the air regions 470 in the x-direction is also evident. By appropriately compensating elongations in the y-direction with a narrowing in the x-direction, it is possible to increase the effective permittivity in the same way as described hereinabove for embodiments maintaining a symmetric fill shape and to achieve the beneficial constant impedance effect described hereinabove so that the transfer efficiency of an optical signal through the coupling device is maximized. In this embodiment, the fill shape of the air regions 470 smoothly varies from a square at the input end to a horizontally-oriented rectangle at the output end through a relative elongation in the y-direction and relative compression in the x-direction. More generally, the air regions are continuously transformed from a high symmetry fill shape at the input end to a lower symmetry fill shape at the output end.

Figure 18:
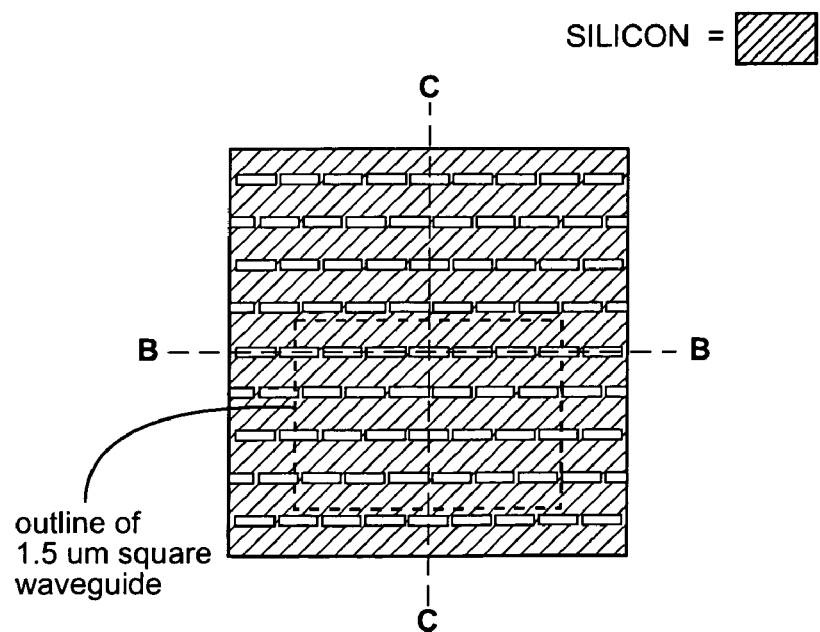
FIG. 18. Internal cross-section of a coupling device comprising silicon and air and interconnected to an optical fiber and a silicon waveguide.
Figure 20:
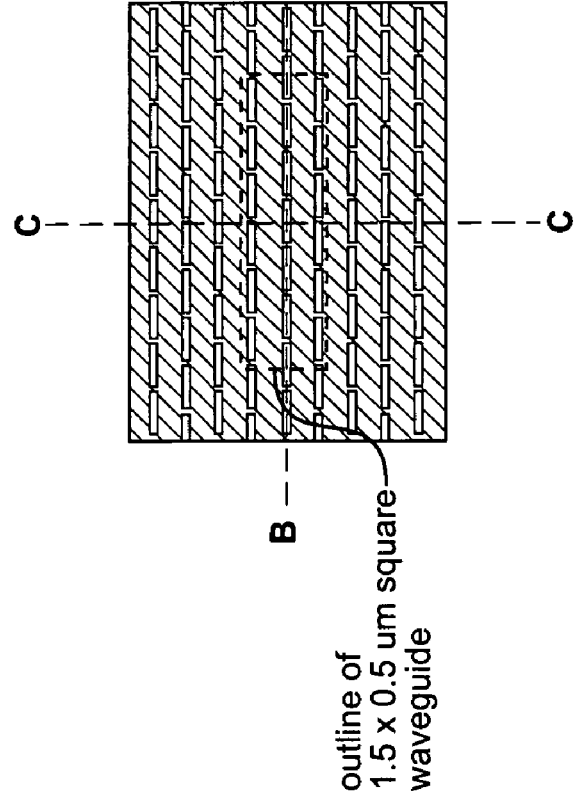
FIG. 20. Internal cross-section of a coupling device comprising silicon and air and interconnected to an optical fiber and a silicon waveguide.
Figure 19:
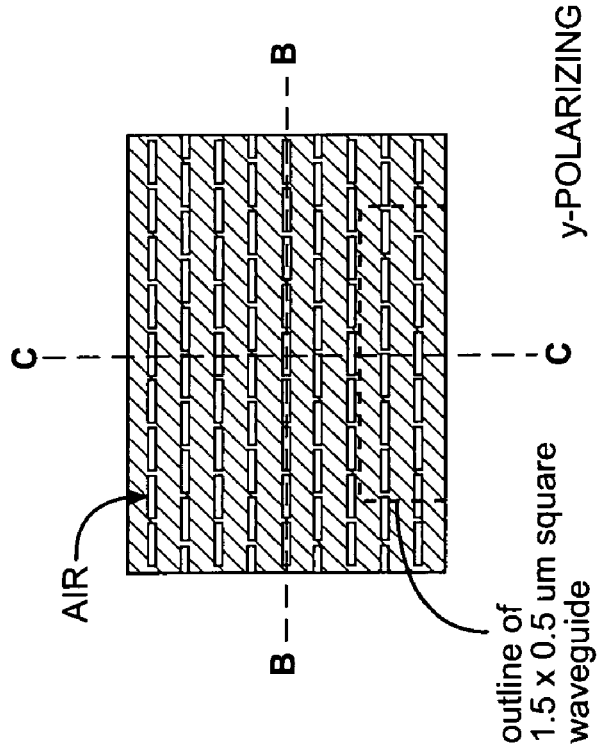
FIG. 19. Internal cross-section of a coupling device comprising silicon and air and interconnected to an optical fiber and a silicon waveguide.

The variations in fill factor of the air regions needed to achieve a desired increase in effective permittivity in the direction of propagation of the optical signal can be achieved by altering the fill area of the discrete air regions and this can be done while continuously providing a relative elongation in the y-direction. FIGS. 18, 19 and 20 show similar embodiments in which the filamentary air regions are elongated in the y-direction for different alignments and/or sizes of the receiving silicon slab waveguide.

Since the air regions become elongated in the y-direction, the coupling devices of this example impose a horizontal polarization on the propagating optical signal. Depending on the situation, optical signals provided by the transmitting element may have random polarization, no polarization or a particular defined state of polarization. When signals having any of these states of polarization are received by and transmitted through the coupling devices of this example, the horizontal elongation of the fill shape of the air regions that occurs in the direction of propagation of the signal alters the polarization of the propagating beam and biases the polarization toward a horizontal state of polarization. If the coupling device is of adequate length, an essentially complete transformation of any polarization state at the input end to a horizontal polarization state at the output end can be achieved. Creation of a horizontal state of polarization is beneficial in situations where an interconnected receiving element transmits a horizontally polarized optical signal more efficiently than other optical signals. The polarization effects described in this example are illustrated by, but not limited to the combination of silicon and air as dielectric materials. Analogous principles apply to any combination of two or more dielectric materials (e.g. combinations of glass and silicon) exhibiting a variation in the fill shape of at least one of the dielectric materials in the direction of propagation of the optical signal.

EXAMPLE 6

Figure 21:
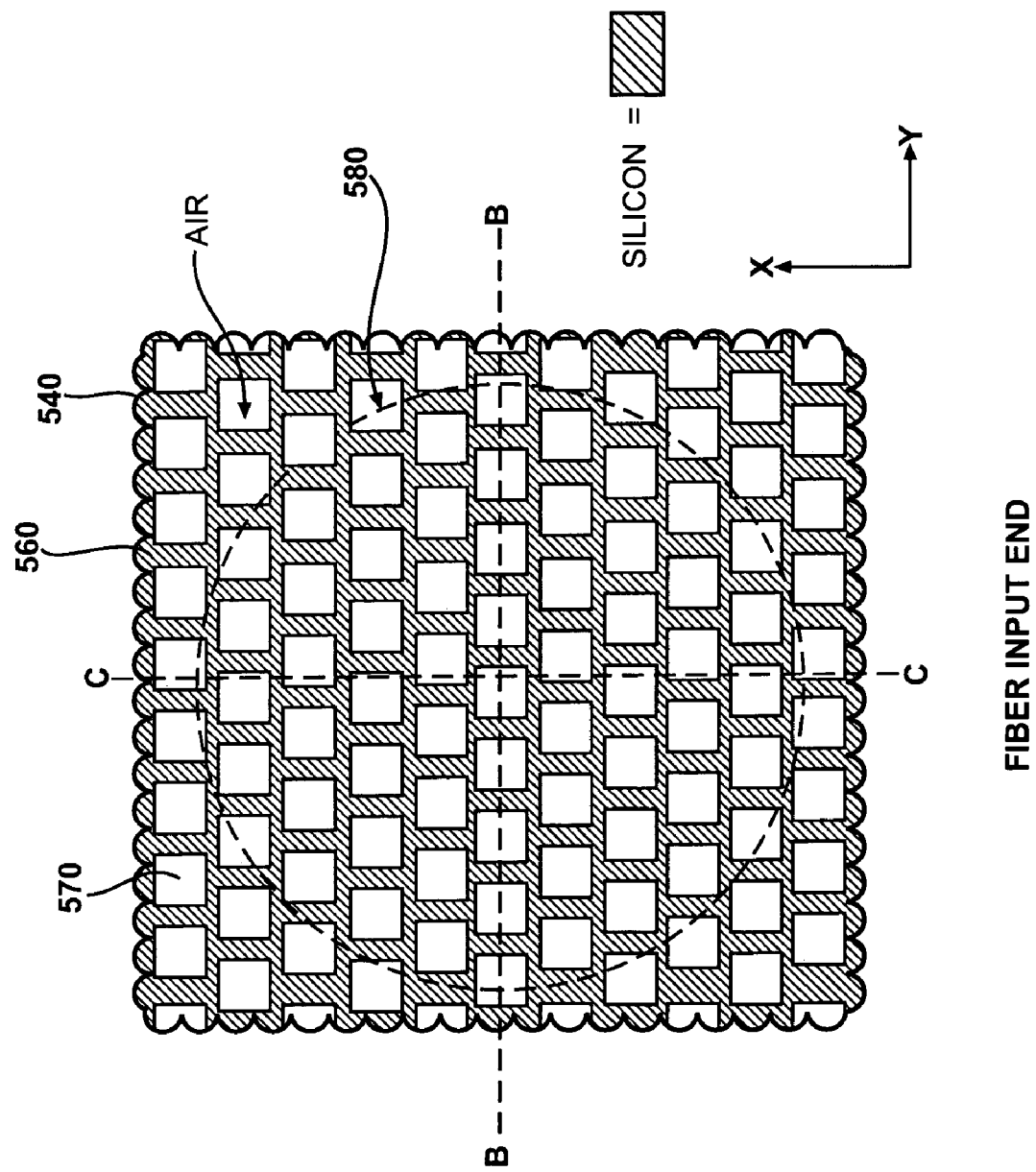
FIG. 21. Input cross-section of a coupling device comprising silicon and air.

In this example, further embodiments are considered in which the shape of the fill shape of one of the dielectric media included in the instant coupling device varies between the input end and the output end of the coupling device. Specifically, embodiments are described in which an optical signal having an arbitrary state of polarization when received at the input end of the coupling device is converted into an optical signal having a polarization that is biased partially or fully in a vertical direction. As in the foregoing examples, we consider coupling devices comprised of silicon and air that interconnect an optical fiber having a glass core and a silicon slab waveguide where the input cross-section includes air regions having a square fill shape interspersed in silicon as shown in the foregoing examples. The input cross-section 540 is reproduced in FIG. 21 and includes discrete air regions 570 and silicon regions 560. Also shown is an outline 580 of the fiber core, reference directions B—B and C—C and coordinate directions x and y as described hereinabove.

Figure 22:
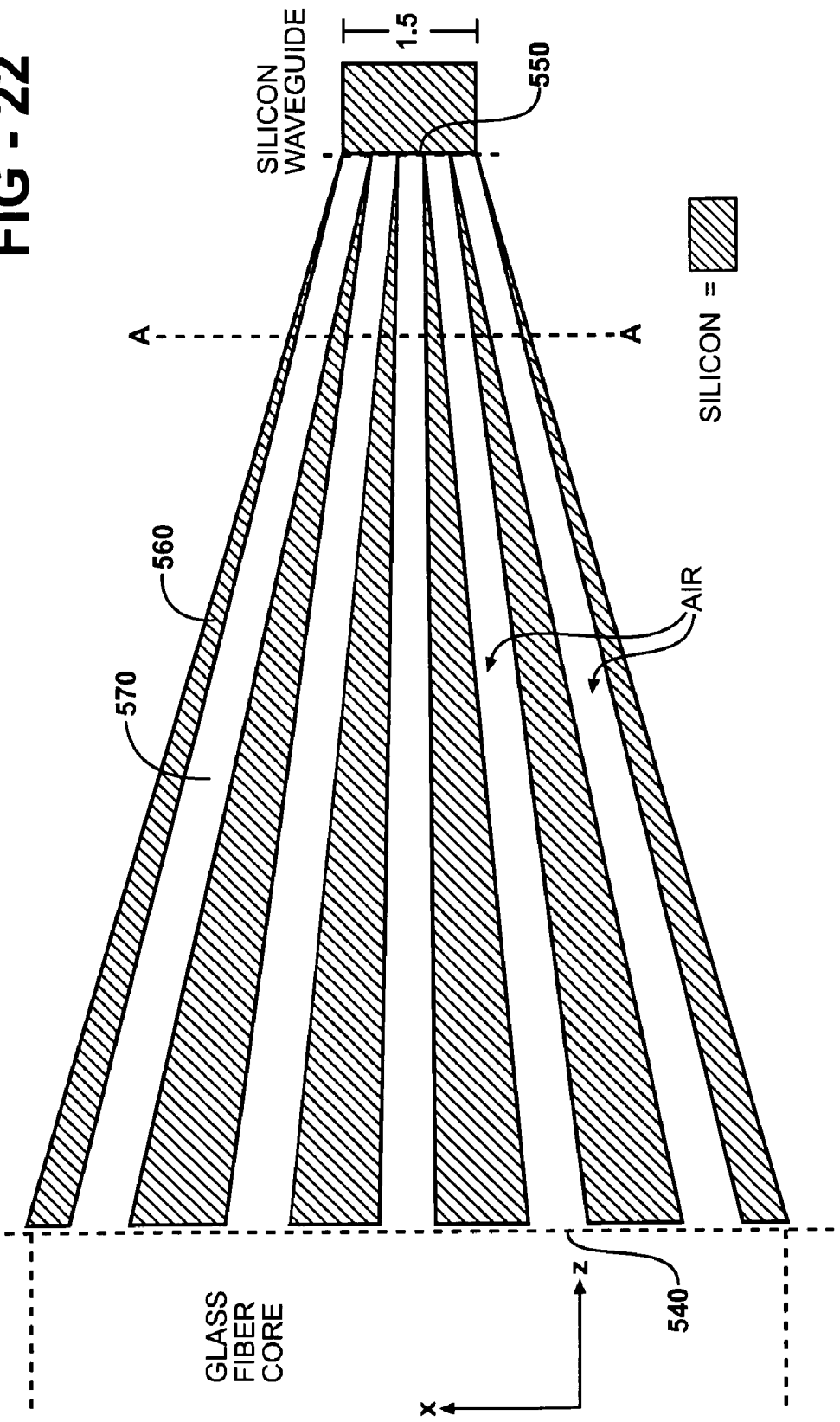
FIG. 22. Side view of a coupling device comprising silicon and air and interconnected to an optical fiber and a silicon waveguide.

A side view of the coupling device, corresponding to a plane perpendicular to the input end and containing reference line C—C, of this embodiment is shown in FIG. 22. The device couples a fiber having a glass core to a silicon slab waveguide. Input cross-section 540, output cross-section 550, silicon regions 560 and air regions 570 are indicated. The side view shows an elongation of the fill shape of the air regions 570, relative to the surrounding silicon regions, in the x-direction. A useful comparison can be made between FIG. 9, which shows the corresponding side view for an embodiment in which the air regions maintain a square fill shape without an elongation. The elongated air regions 570 occupy an increasing portion of the linear dimension in the x-direction relative to the silicon regions 560 in FIG. 22 and also relative to the air regions 270 in FIG. 9.

Figure 23:
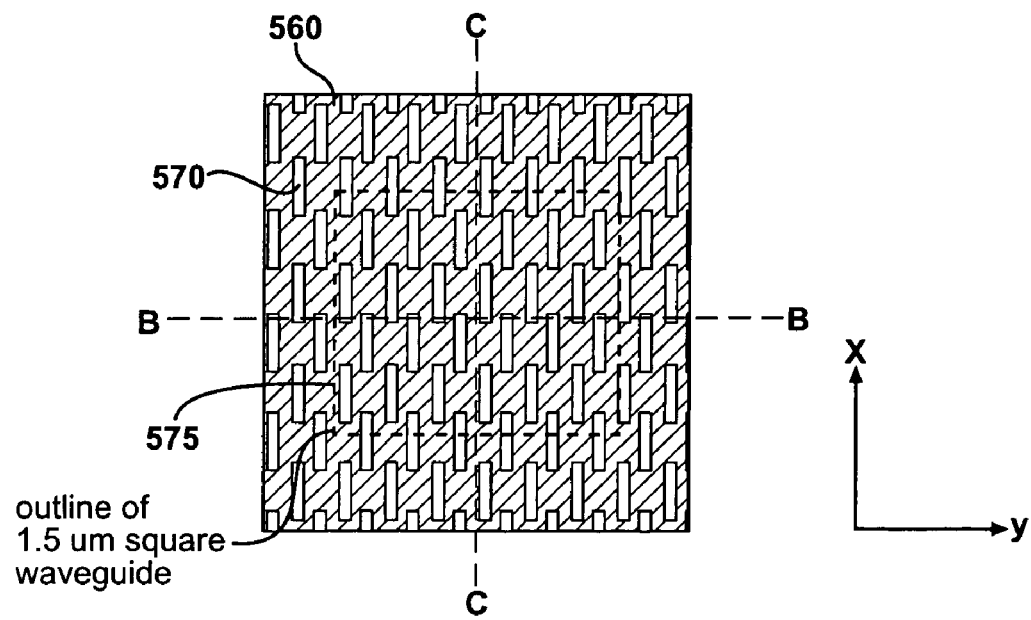
FIG. 23. Internal cross-section of a coupling device comprising silicon and air and interconnected to an optical fiber and a silicon waveguide.

FIG. 23 shows an internal cross-section corresponding to the position indicated by reference line A—A in FIG. 22. The cross-section is an xy cross-section and is an embodiment in which the central axis of the coupling device is aligned with the central axis of the receiving silicon slab waveguide. An outline 575 of a 1.5 µm×1.5 µm square silicon waveguide is indicated along with silicon regions 560 and air regions 570. From this perspective view, the elongation of the air regions 570 in the x-direction relative to the y-direction is evident. The relative narrowing of the air regions 570 in the y-direction is also evident. By appropriately compensating elongations in the x-direction with a narrowing in the y-direction, it is possible to increase the effective permittivity in the same way as described hereinabove for embodiments maintaining a symmetric fill shape and to achieve the beneficial constant impedance effect described hereinabove so that the transfer efficiency of an optical signal through the coupling device is maximized. In this embodiment, the fill shape of the air regions 570 smoothly varies from a square at the input end to a vertically-oriented rectangle at the output end through a relative elongation in the x-direction and relative compression in the y-direction. More generally, the air regions are continuously transformed from a high symmetry fill shape at the input end to a lower symmetry fill shape at the output end.

Figure 24:
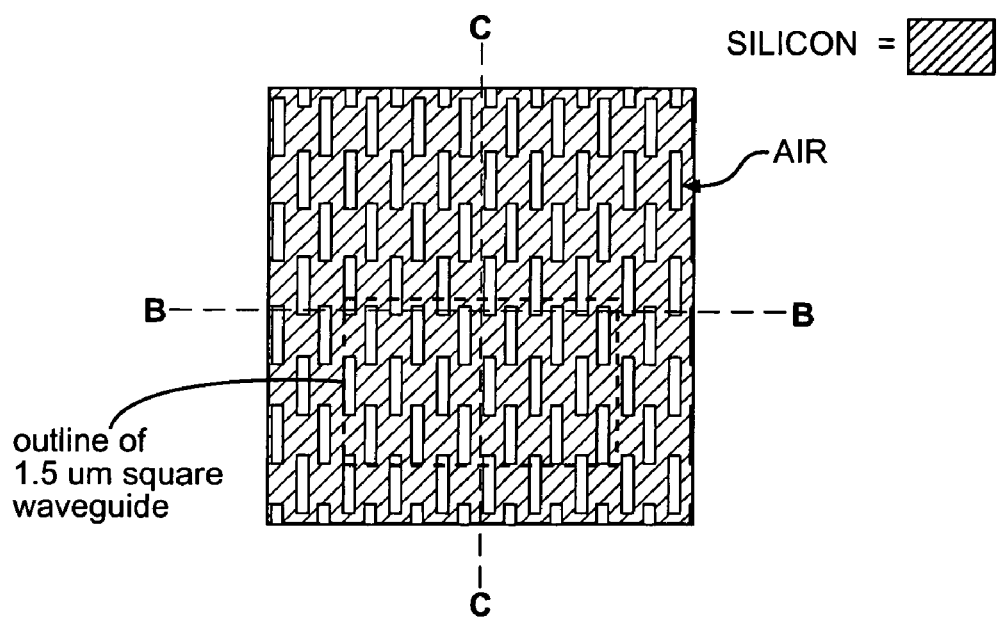
FIG. 24. Internal cross-section of a coupling device comprising silicon and air and interconnected to an optical fiber and a silicon waveguide.
Figure 25:
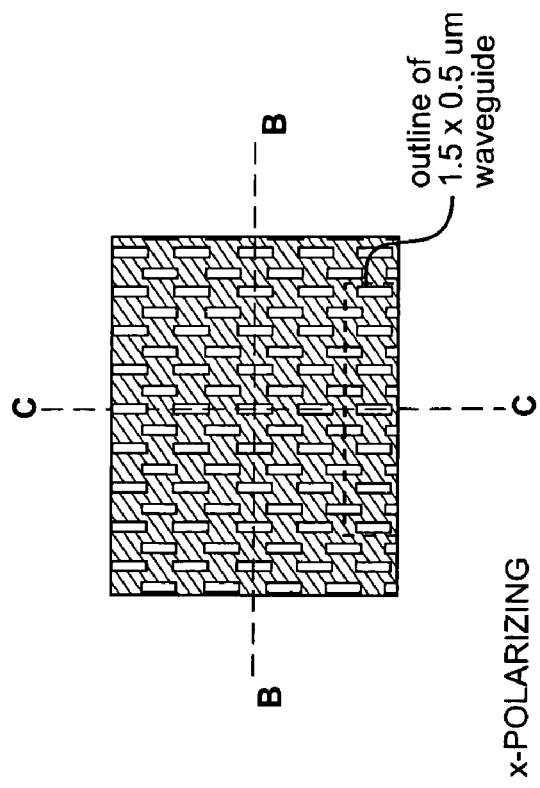
FIG. 25. Internal cross-section of a coupling device comprising silicon and air and interconnected to an optical fiber and a silicon waveguide.
Figure 26:
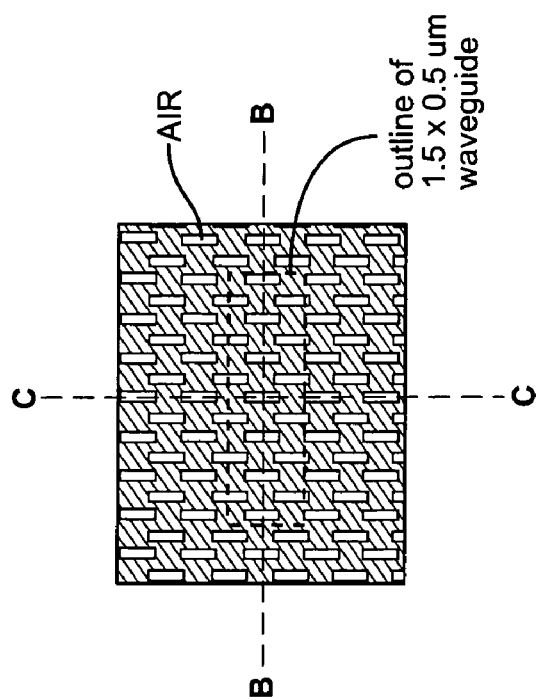
FIG. 26. Internal cross-section of a coupling device comprising silicon and air and interconnected to an optical fiber and a silicon waveguide.

The variations in fill factor of the air regions needed to achieve a desired increase in effective permittivity in the direction of propagation of the optical signal can be achieved by altering the fill area of the individual air regions and this can be done while continuously providing a relative elongation in the x-direction. FIGS. 24, 25 and 26 show similar embodiments in which the air regions are elongated in the x-direction for different alignments and/or sizes of the receiving silicon slab waveguide.

Since the air regions become elongated in the x-direction, the coupling devices of this example impose a vertical polarization on the propagating optical signal. Depending on the situation, optical signals provided by the transmitting element may have random polarization, no polarization or a particular defined state of polarization. When signals having any of these states of polarization are received by and transmitted through the coupling devices of this example, the vertical elongation of the fill shape of the air regions that occurs in the direction of propagation of the signal alters the polarization of the propagating beam and biases the polarization toward a vertical state of polarization. If the coupling device is of adequate length, an essentially complete transformation of any polarization state at the input end to a vertical polarization state at the output end can be achieved. Creation of a vertical state of polarization is beneficial in situations where an interconnected receiving element transmits a vertically polarized optical signal more efficiently than other optical signals. The polarization effects described in this example are illustrated by, but not limited to the combination of silicon and air as dielectric materials. Analogous principles apply to any combination of two or more dielectric materials (e.g. combinations of glass and silicon) exhibiting a variation in the fill shape of at least one of the dielectric materials in the direction of propagation of the optical signal.

Embodiments described in the foregoing examples couples an optical signal from a round fiber as transmitting element to a square or rectangular slab waveguide as receiving element. In these embodiments, the optical signal is transformed from a beam having a circular cross-section into a beam having a rectangular cross-section. Other embodiments of this invention permit the coupling of optical signals between two fibers (e.g. transfer of an optical signal from a large diameter fiber to a small diameter fiber or vice versa) or two slab waveguides (e.g. transfer of an optical signal from a waveguide having a square cross-section to a waveguide having a rectangular cross-section or vice versa, between a large side length square waveguide to a small side length square waveguide or vice versa, from a waveguide having one rectangular cross-section to a waveguide having a different rectangular cross-section etc.). Optical signals having beams having arbitrary cross-sectional shapes can also be supported within and transported by the instant coupling devices. Optical beams having an elliptical cross-section, for example, may be coupled between a transmitting element and a receiving element in other embodiments of the instant invention. Elliptical beams can be transformed into circular or rectangular beams or vice versa and beams of an arbitrary cross-sectional shape can be generally transformed into a different arbitrary shape. In other embodiments, beams of a given shape can maintain that shape while being enlarged or reduced in dimension during propagation through a coupling device according to the instant invention. The input and output cross-sections of the instant coupling devices and the fill areas of interspersed and/or filamentary regions may be round, square, rectangular, or any other shape including round or linear sides including symmetric and asymmetric shapes.

In still other embodiments, the state of polarization can be transformed from among and between unpolarized, randomly polarized, vertically polarized, horizontally polarized, and intermediate states of polarization. Modification in polarization can occur in combination with or independently of a change in the shape or size of the cross-section of an optical beam.

A coupling element within the scope of the instant invention comprises two or more dielectric materials having at least one dielectric material that has a variation in fill area, fill shape and/or fill size along a propagation direction within the device and constant or nearly constant impedance within the device. Embodiments of the invention include those in which one or more dielectric materials are interspersed to form discrete or continuous regions within a dielectric material and those in which one or more dielectric materials form discrete or continuous filamentary regions within a dielectric material. The filamentary regions may be formed from a single dielectric material or a combination of materials and different filamentary regions may be formed from the same or different material or combination of materials. The number of filamentary regions may be as few as one with no upper limit. The filamentary regions may be arbitrarily positioned relative to each other or formed in such a way that the fill areas of different filamentary regions are periodically arranged within one or more cross-sections of the device. Variations in fill factor of a dielectric material along the instant device can be achieved through variations in the size or shape of the cross-section of the device or one or more of the filaments or a combination thereof.

In addition to dual material combinations based on air and silicon, and glass and silicon as described in the foregoing illustrative examples, it is to be appreciated that the instant coupling devices may contain three or more dielectric materials and that the devices may include materials other than air, glass and silicon may be included therein. Dielectrics including, but not limited to, air, silicon, germanium, compound semiconductors such as III–V's (e.g. including alloys and compounds such as GaAs, InP, InGaAs, AlInGaAs etc.) and II–VI's (e.g. CdS, CdSe, ZnS, ZnSe, etc.) oxide; chalcogenide crystals and glasses generally, including metal oxides, silicates, zeolites, perovskites, garnets; polymers, gels, diamond, and combinations thereof may be employed as dielectric materials in the instant devices.

It is further to be appreciated that the dielectric materials included in the instant coupling device may be the same as or different from the materials present in the interconnected transmitting and receiving devices. The principles of operation rely on considerations pertaining to impedance matching at the input and output ends and conservation of impedance through the coupling device. As discussed hereinabove, the required impedance conditions can be met through variations in the effective permittivity and cross-sectional shape of the coupling device. A particular effective permittivity can be achieved through many different combinations of materials and may or may not be accomplished by using materials in the instant coupling device that are common to the transmitting and/or receiving devices. A particular modification of the state of polarization may also be achieved with or without combinations of dielectric materials that match the materials of the transmitting and receiving elements.

The disclosure and discussion set forth herein is illustrative and not intended to limit the practice of the instant invention. While there have been described what are believed to be the preferred embodiments of the instant invention, those skilled in the art will recognize that other and further changes and modifications may be made thereto without departing from the spirit of the invention, and it is intended to claim all such changes and modifications that fall within the full scope of the invention. It is the following claims, including all equivalents, in combination with the foregoing disclosure and knowledge commonly available to persons of skill in the art, which define the scope of the instant invention.

I claim:

1. An optical coupling device comprising a first dielectric material and a second dielectric material, said coupling device having:
   an input end for receiving an optical signal, said input end having an input cross-section, said input cross-section having a first fill factor of said first dielectric material;
   an output end for delivering said optical signal, said output end having an output cross-section, said output cross-section having a second fill factor of said first dielectric material; and
   an internal portion between said input end and said output end, said internal portion having a plurality of internal cross-sections;
   wherein said first dielectric material is internally dispersed forming one or more discrete regions within said second dielectric material;
   wherein said internally dispersed discrete regions include one or more filamentary regions, said filamentary regions extending continuously from said input end through said internal portion to said output end of said device, each of said filamentary regions occupying a fill area in each of said input, internal and output cross-sections, said fill area having a fill size and shape,
   wherein the fill factor of said first dielectric material varies continuously over the length of said internal portion from said first fill factor at said input cross-section to said second fill factor at said output cross-section, said first fill factor differing from said second fill factor.

2. The coupling device of claim 1, wherein said first and second dielectric materials are selected from the group consisting of air, glass and silicon.

3. The coupling device of claim 1, wherein said fill shape of said one or more filamentary regions is the same in said input, internal and output cross-sections.

4. The coupling device of claim 3, wherein said fill shape is square, rectangular, circular or elliptical.

5. The coupling device of claim 3, wherein the fill size of said one or more filamentary regions varies between said input end and said output end of said device.

6. The coupling device of claim 1, wherein the fill shape of said one or more filamentary regions varies between said input end and said output end of said device.

7. The coupling device of claim 6, wherein the fill shape of said one or more filamentary regions is square in one of said input and output cross-sections and rectangular in the other of said input and output cross-sections.

8. The coupling device of claim 1, wherein the fill areas of said filamentary regions are periodically arranged in said input, internal and output cross-sections.

9. The coupling device of claim 1, wherein said one or more filamentary regions include a first filamentary region and a second filamentary region, said first and second filamentary regions differing in fill shape.

10. The coupling device of claim 1, wherein said one or more filamentary regions include a first filamentary region and a second filamentary region, said first and second filamentary regions differing in fill size.

11. The coupling device of claim 1, wherein said first dielectric material forms two or more discrete regions within said second dielectric material.

12. The coupling device of claim 11, wherein said two or more discrete regions are arranged periodically within said second dielectric material.

13. The coupling device of claim 11, wherein the cross-sections of said two or more discrete regions are arranged periodically within said input cross-section or said output cross-section.

14. The coupling device of claim 1, wherein said input cross-section and said output cross-section differ in size or shape.

15. The coupling device of claim 1, wherein said internal cross-sections vary in shape or size between said input end and said output end.

16. The coupling device of claim 1, wherein the characteristic impedance of said internal portion of said device is constant.

17. The coupling device of claim 1, wherein the effective permittivity of said device varies continuously between said input end and said output end.

18. The coupling device of claim 1, wherein the effective permeability of said device varies continuously between said input end and said output end.

19. The coupling device of claim 1, wherein the optical signal received at said input end has a different polarization than the optical signal delivered by said output end.

20. The coupling device of claim 19, wherein said optical signal at one of said input end or said output end is unpolarized or randomly polarized and the optical signal at the other of said input end or said output end is linearly polarized.

21. An optical circuit comprising:
   the optical coupling device of claim 1;
   a transmitting element interconnected to said input end of said coupling device, said transmitting element providing said optical signal received by said input end;
   a receiving element interconnected to said output end of said coupling device, said receiving element receiving said optical signal delivered by said output end.

22. The optical circuit of claim 21, wherein said transmitting element is an optical fiber or a slab waveguide and said receiving element is an optical fiber or a slab waveguide.

23. The optical circuit of claim 21, wherein the central axes of said transmitting element, said coupling device and said receiving device are aligned.

24. The optical circuit of claim 21, wherein a boundary of said transmitting element, a boundary of said coupling device and a boundary of said receiving device lie in a common plane.

25. The coupling device of claim 1, wherein said device comprises a plurality of said filamentary regions.

* * * * *